(12) United States Patent
Okamoto et al.

(10) Patent No.: US 7,191,961 B2
(45) Date of Patent: Mar. 20, 2007

(54) INJECTION HOLE PLATE AND FUEL INJECTION APPARATUS HAVING THE SAME

(75) Inventors: Atsuya Okamoto, Okazaki (JP); Takeshi Mizobuchi, Okazaki (JP); Takehiko Kato, Nukata-gun (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 0 days.

(21) Appl. No.: 10/721,249

(22) Filed: Nov. 26, 2003

(65) Prior Publication Data

US 2004/0104285 A1 Jun. 3, 2004

(30) Foreign Application Priority Data

Nov. 29, 2002 (JP) ............................. 2002-347437
May 9, 2003 (JP) ............................. 2003-131407

(51) Int. Cl.
*F02M 61/00* (2006.01)

(52) U.S. Cl. ................. 239/533.12; 239/533.1

(58) Field of Classification Search ................ 123/472; 239/533.1, 533.12, 533.14, 403
See application file for complete search history.

(56) References Cited

U.S. PATENT DOCUMENTS

| | | | |
|---|---|---|---|
| 5,465,906 A | 11/1995 | Hans | |
| 5,931,391 A | 8/1999 | Tani et al. | |
| 6,170,763 B1* | 1/2001 | Fuchs et al. | 239/533.12 |
| 6,205,983 B1* | 3/2001 | Egizi | 123/531 |
| 6,257,496 B1* | 7/2001 | Wyant | 239/5 |
| 6,695,229 B1* | 2/2004 | Heinbuch et al. | 239/494 |
| 6,848,635 B2* | 2/2005 | Xu | 239/533.12 |
| 6,929,196 B2* | 8/2005 | Togashi et al. | 239/533.14 |
| 2003/0141385 A1* | 7/2003 | Xu | 239/463 |
| 2003/0164412 A1* | 9/2003 | Iwase | 239/533.12 |
| 2003/0222159 A1* | 12/2003 | Kobayashi et al. | 239/533.12 |
| 2004/0026538 A1* | 2/2004 | Heyse | 239/533.12 |
| 2004/0129806 A1* | 7/2004 | Dantes et al. | 239/533.12 |
| 2004/0159721 A1* | 8/2004 | Shiraishi et al. | 239/533.12 |

FOREIGN PATENT DOCUMENTS

JP 7-317628 12/1995

* cited by examiner

*Primary Examiner*—Carl S. Miller
(74) *Attorney, Agent, or Firm*—Nixon & Vanderhye PC

(57) ABSTRACT

In an injection hole plate of a fuel injection apparatus, a second-side hole section of each injection hole extends from a downstream end of a base wall of the injection hole plate and is communicated with first-side hole sections, which extends from an upstream end of the wall of the injection hole plate to an axially intermediate point of the wall. The first-side hole sections may discharge fuel into the second-side hole section in a manner that forms a swirl fuel flow in the second-side hole section. The injection hole plate may includes a collision portion, in which fuel flows supplied from the first-side hole sections collide with one another.

20 Claims, 18 Drawing Sheets

INJECTION HOLE PLATE AND FUEL INJECTION APPARATUS HAVING THE SAME

CROSS REFERENCE TO RELATED APPLICATION

This application is based on and incorporates herein by reference Japanese Patent Application No. 2002-347437 filed on Nov. 29, 2002 and Japanese Patent Application No. 2003-131407 filed on May 9, 2003.

BACKGROUND OF THE INVENTION

1. Field of the Invention

The present invention relates to a fuel injection apparatus (hereinafter, referred to as an injector) for injecting fuel in an internal combustion engine (hereinafter, referred to as an engine).

2. Description of Related Art

Promotion of atomization of fuel, which is injected directly into a combustion chamber of an engine or is injected into an intake pipe connected to the combustion chamber of the engine, is important to reduce noxious components contained in exhaust gases and to increase performance of the engine or to improve fuel consumption.

For example, in an injector disclosed in Japanese Unexamined Patent Publication No. 11-70347, which corresponds to U.S. Pat. No. 5,931,391, injection holes are provided in an injection hole plate. The injection hole plate is provided separately from a valve body, which receives a valve member. In this case, shapes and positions of the injection holes can be more easily changed at the time of designing the injector, so that a spray pattern of fuel discharged from the corresponding injection hole can be more freely selected.

In the injector disclosed in Japanese Unexamined Patent Publication No. 11-70347, fuel supplied from a fuel passage, which is defined in the valve body, is directly supplied to the injection hole plate, and turbulence is created in the fuel flow supplied from the fuel passage before entering the injection holes of the injection hole plate. In this way, atomization of injected fuel is promoted. However, in this case, fuel, which passes the corresponding injection hole, is influenced by an inner peripheral wall of the injection hole, which tends to rectify the fuel flow. Thus, a degree of turbulence of the fuel flow is reduced, and thus atomization of injected fuel is limited.

SUMMARY OF THE INVENTION

The present invention addresses the above disadvantage. Thus, it is an objective of the present invention to provide an injection hole plate, which further promotes atomization of injected fuel. It is another objective of the present invention to provide a fuel injection apparatus having such an injection hole plate.

To achieve the objectives of the present invention, there is provided a fuel injection apparatus including a valve body, an injection hole plate and a valve member. The valve body includes a valve seat, which is formed in an inner peripheral surface of the valve body that forms a fuel passage in the valve body. The injection hole plate is arranged downstream of the valve seat and includes a wall, which has a plurality of injection holes. The injection holes penetrate through the wall of the injection hole plate to inject fuel supplied from the fuel passage. The valve member is reciprocably received in the valve body and is seatable against the valve seat. The valve member enables fuel injection from the injection holes when the valve member is lifted away from the valve seat. The valve member disables fuel injection from the injection holes when the valve member is seated against the valve seat. Each injection hole of the injection hole plate includes at least one first-side hole section and a second-side hole section. The at least one first-side hole section extends from an upstream end of the wall of the injection hole plate to an axially intermediate point of the wall of the injection hole plate, which is located between the upstream end of the wall and a downstream end of the wall. The second-side hole section extends from the downstream end of the wall of the injection hole plate and is communicated with the at least one first-side hole section. The at least one first-side hole section discharges fuel into the second-side hole section in a manner that forms a swirl fuel flow in the second-side hole section.

In place of the above injection hole plate, there may be provided an injection hole plate that is arranged downstream of the valve seat and includes a wall, which has a plurality of injection holes. The injection holes penetrate through the wall of the injection hole plate to inject fuel supplied from the fuel passage. Each injection hole of the injection hole plate includes at least one first-side hole section, a collision portion and at least one second-side hole section. The at least one first-side hole section extends from an upstream end of the wall of the injection hole plate to an axially intermediate point of the wall of the injection hole plate, which is located between the upstream end of the wall and a downstream end of the wall. Fuel flows supplied from the at least one first-side hole section collide with one another in the collision portion. The at least one second-side hole section extends from the downstream end of the wall of the injection hole plate and is communicated with the at least one first-side hole section. The at least one second-side hole section conducts fuel collided in the collision portion to the downstream end of the wall of the injection hole plate.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
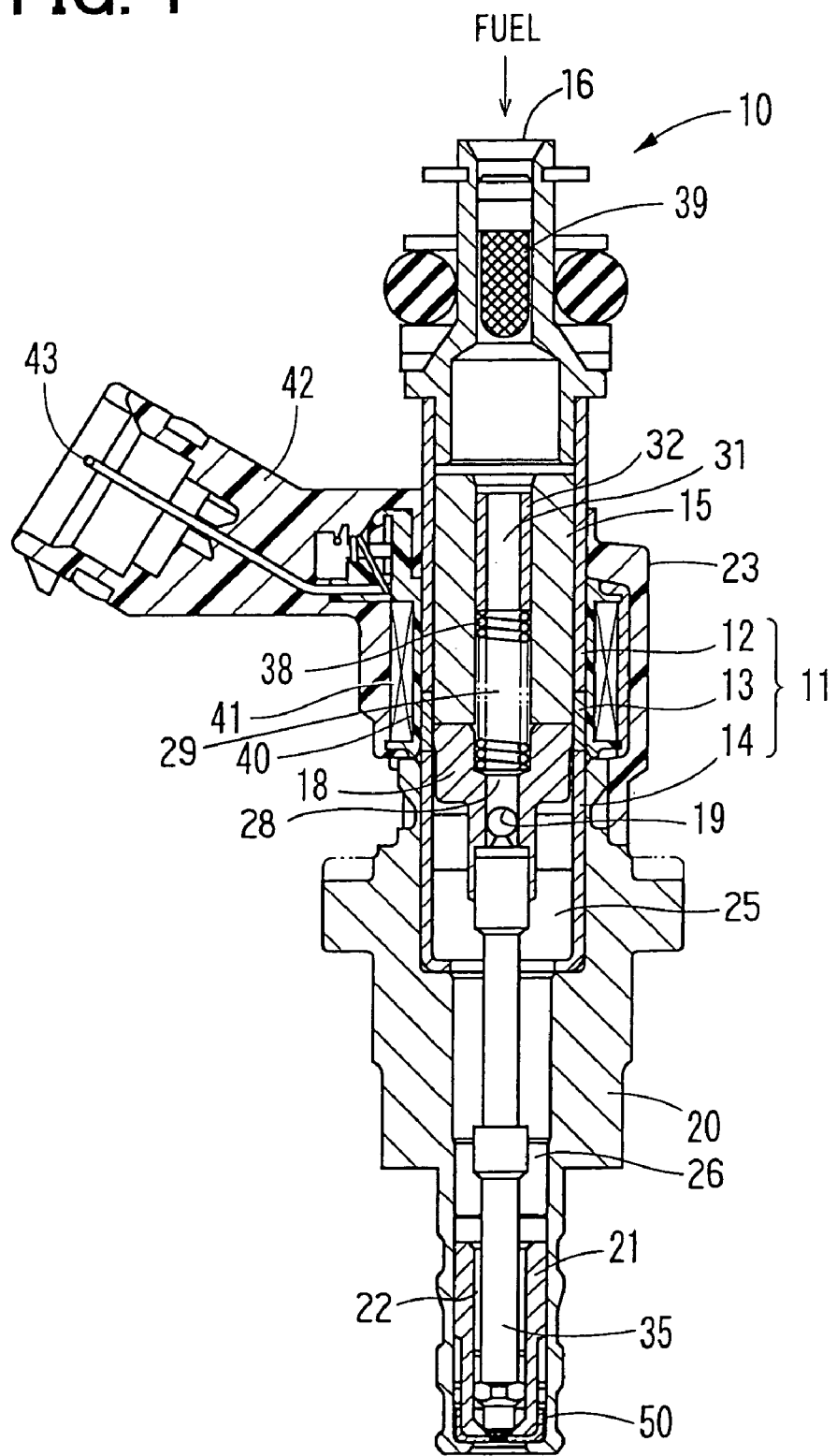
FIG. 1 is a cross sectional view of an injector according to a first embodiment of the present invention.
Figure 2:
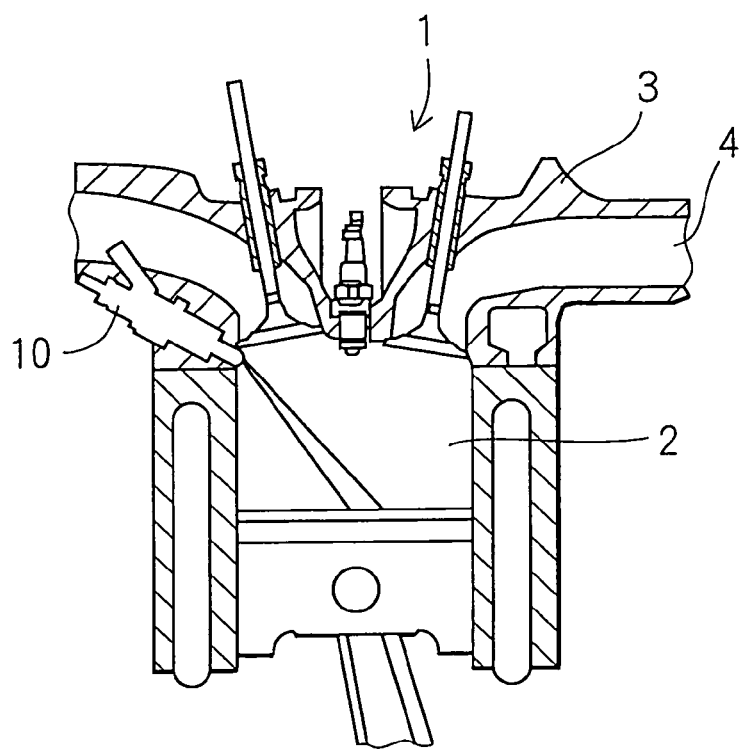
FIG. 2 is a partial schematic view showing a portion of a gasoline engine, to which the injector of the first embodiment is applied.

FIG. 1 shows a fuel injection apparatus (hereinafter, referred to as injector) 10 according to a first embodiment of the present invention. As shown in FIG. 2, the injector 10 is installed to a cylinder head 3, which forms combustion chambers (only one is depicted) 2 of a gasoline engine 1. That is, the injector 10 is used in the gasoline engine 1 of a direct injection type, in which fuel is directly injected into each combustion chamber 2. However, it should be understood that the injector 10 is equally applicable to a gasoline engine of a premixed combustion type, in which fuel is injected into intake air that flows through an intake pipe 4 communicated with the combustion chamber 2.

As shown in FIG. 1, a housing 11 is formed into a cylindrical shape. The housing 11 includes a first magnetic portion 12, a non-magnetic portion 13 and a second magnetic portion 14, which are coaxially arranged. The non-magnetic portion 13 prevents magnetic short circuit between the first magnetic portion 12 and the second magnetic portion 14. A stationary core 15 is made of a magnetic material and is shaped into a cylindrical body. Also, the stationary core 15 is secured coaxially with the housing 11 at a location radially inward of the housing 11. A movable core 18 is made of a magnetic material and is shaped into a cylindrical body. Also, the movable core 18 is coaxially positioned at a location radially inward of the housing 11. The movable core 18 can reciprocate in the axial direction at a location downstream of the stationary core 15. A drain hole 19, which passes through a peripheral wall of the movable core 18, forms a fuel passage that connects between the outside and inside of the movable core 18.

A spool 40 is arranged radially outward of the housing 11, and a coil 41 is wound around the spool 40. A resin molded part 23 covers an outer peripheral portion of the spool 40 and an outer peripheral portion of the coil 41. The resin molded part 23 includes a connector 42, into which a terminal 43 is insert molded. The coil 41 is electrically connected to the terminal 43. When the coil 41 is powered through the terminal 43, a magnetic attractive force is developed between the stationary core 15 and the movable core 18.

Figure 3:
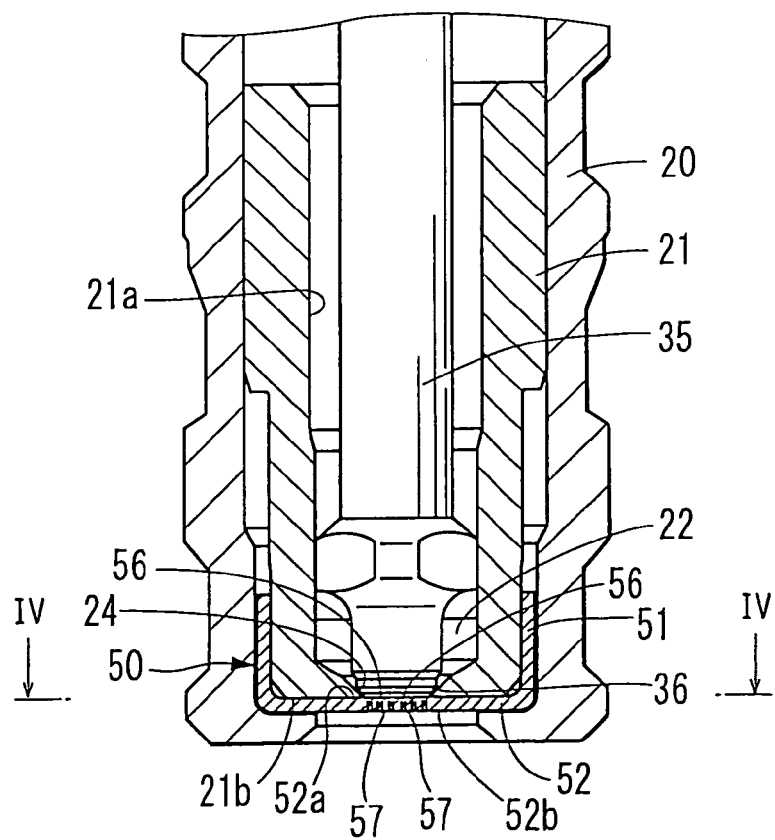
FIG. 3 is a partial enlarged view of the injector of the first embodiment.

As shown in FIGS. 1 and 3, a nozzle holder 20 is shaped into a cylindrical body and is secured to a downstream end of the housing 11. A valve body 21 is shaped into a cylindrical body and is securely welded to an inner peripheral part of a downstream end of the nozzle holder 20. An inner peripheral wall surface 21a of the valve body 21 defines a fuel passage 22. Furthermore, a portion of the inner peripheral wall surface 21a of the valve body 21, which forms a downstream end of the fuel passage 22, is formed into a conical shape that has a decreasing inner diameter, which decreases toward its downstream end. A valve seat 24 is provided in the conical shaped portion of the inner-peripheral wall surface 21a.

As shown in FIG. 3, an injection hole plate 50 is made as a single metal member, which is shaped into a cup body, and includes a peripheral wall portion 51 and a base wall portion 52 connected together.

A downstream end of the valve body 21 is fitted to an inner peripheral surface of the peripheral wall portion 51. An end surface 21b of the downstream end of the valve body 21 is engaged with a surface of an upstream end (also referred to as an inner wall surface) 52a of the base wall portion 52. The injection hole plate 50 is positioned with respect to the valve body 21 in the radial direction through engagement between the peripheral wall portion 51 and the valve body 21. The peripheral wall portion 51 and the nozzle holder 20, which is fitted to an outer peripheral surface of the peripheral wall portion 51, are securely welded to the valve body 21.

Figure 4:
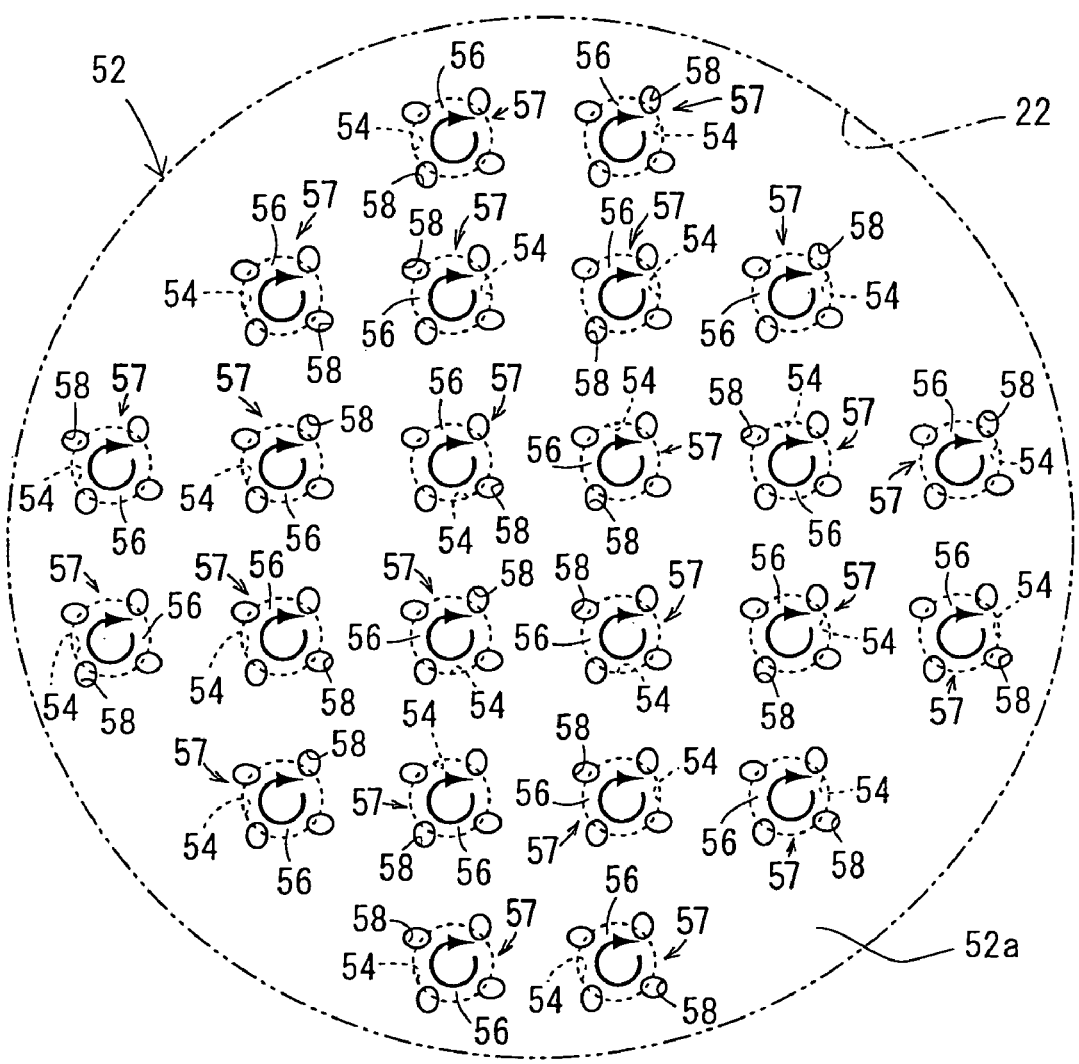
FIG. 4 is an enlarged plan view along line IV—IV in FIG. 3 showing a base wall portion of an injection hole plate of the injector of the first embodiment.

As shown in FIGS. 3 and 4, a plurality of injection holes 57 is provided in the center of the base wall portion 52 in such a manner that the injection holes 57 are arranged at generally equal intervals. Each injection hole 57 includes a plurality of first-side hole sections (in this embodiment, the number of the first-side hole sections is four) 58 and one second-side hole section 54. The first-side hole sections 58 serve as swirl flow generative passage sections, which generate a swirl flow in the corresponding second-side hole section 54. The second-side hole section 54 is formed as a cylindrical hole that has a circular cross section. The second-side hole section 54 extends linearly in a thickness direction of the circular base wall portion 52, i.e., in the axial direction of the injector 10. A downstream end of each second-side hole section 54 is opened in an surface of a downstream end (also referred to as an outer wall surface) 52b of the base wall portion 52 on a side opposite from the valve body 21. An upstream end of the second-side hole section 54 is covered with a corresponding cover portion 56.

Figure 5A:
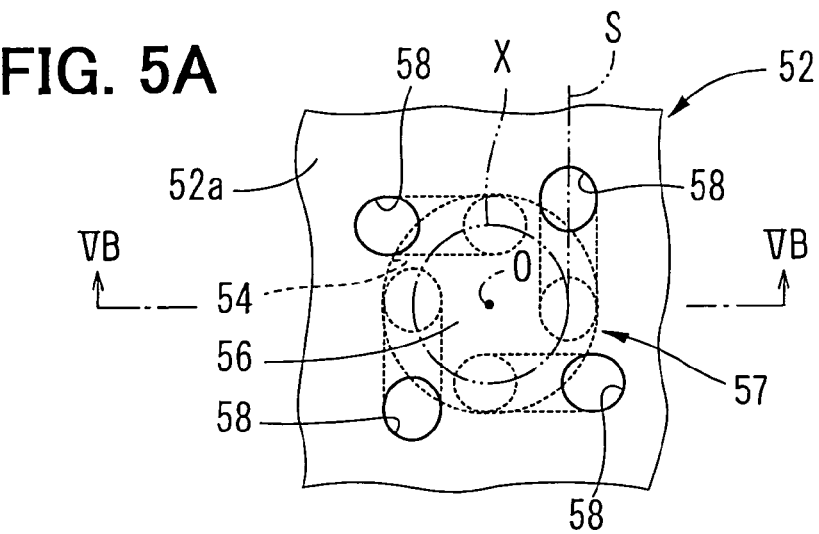
FIG. 5A is a partial enlarged plan view showing the base wall portion of the injection hole plate of the first embodiment.
Figure 5B:
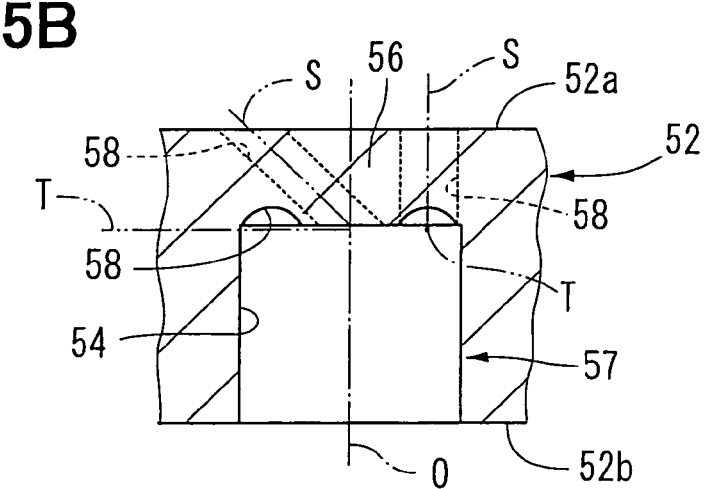
FIG. 5B is a cross sectional view along line VB—VB in FIG. 5A.
Figure 5C:
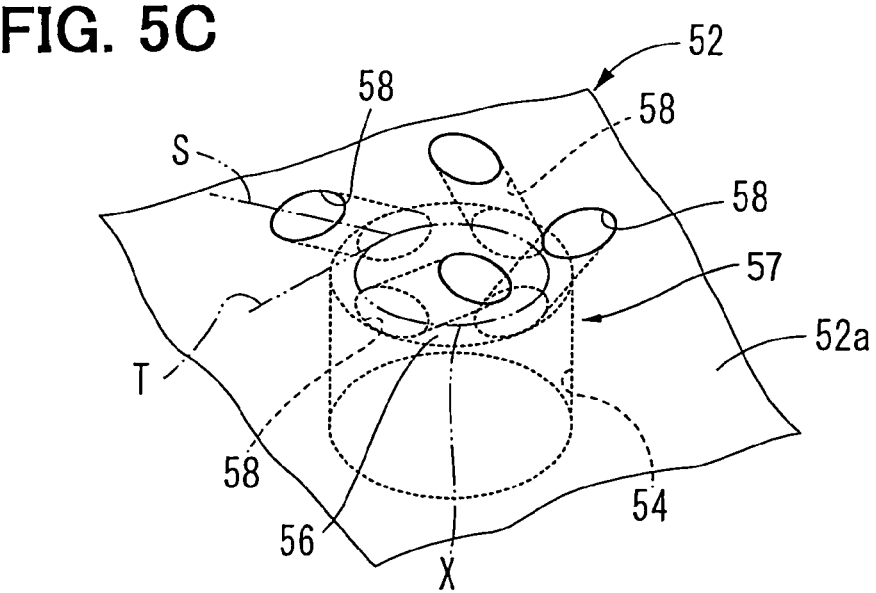
FIG. 5C is a partial perspective view showing the base wall portion of the injection hole plate of FIGS. 5A and 5B.
Figure 6A:
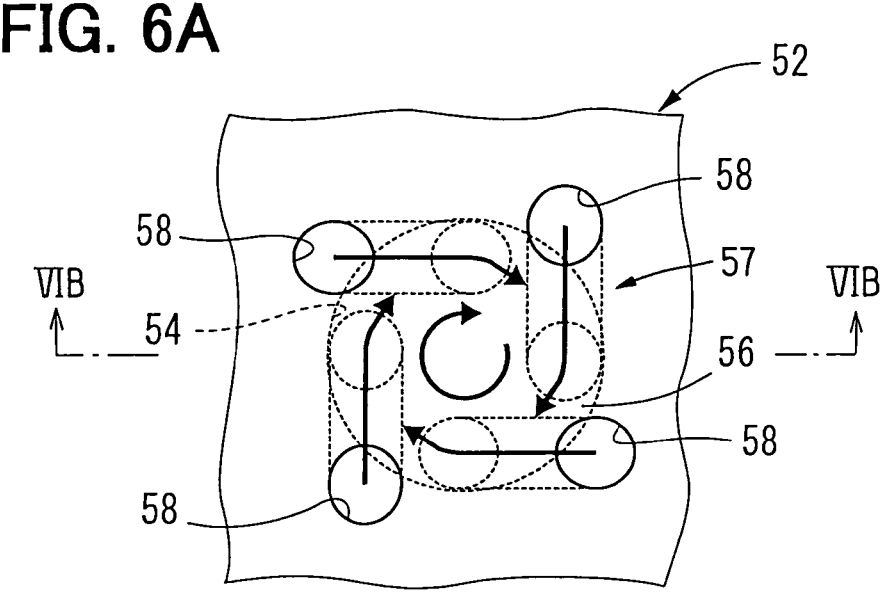
FIG. 6A is a partial enlarged plan view showing a fuel flow generated in the injector of the first embodiment.

As shown in FIGS. 5A–5C, each first-side hole section 58 is formed as a cylindrical hole having a circular cross section. The first-side hole section 58 penetrates through the cover portion 56 from the second-side hole section 54 and is opened in the upstream end 52a of the base wall portion 52. With this arrangement, the first-side hole section 58 communicates between the upstream end of the corresponding second-side hole section 54 and a portion of the fuel passage 22 located downstream of the valve seat 24. Each first-side hole section 58 extends in a corresponding direction S, which is axially angled to a tangent line T to an imaginary circle X to define an acute angle with respect to the tangent line T to the imaginary circle X on the upstream side of the imaginary circle X. Here, the imaginary circle X is concentric with an inner circumference of the upstream end of the second-side hole section 54. The first-side hole sections 58, which are associated with the corresponding second-side hole section 54, are arranged with rotational symmetry about a central axis O, which extends through the center of the imaginary circle X. Furthermore, as shown in FIG. 6A, these first-side hole sections 58 conduct supplied fuel and generate swirl flows directed in a common direction in the second-side hole section 54. In the present embodiment, extending directions of the first-side hole sections 58 are set in such a manner that the swirl direction of the swirl flow generated in every single second-side hole section 54 is directed in the common direction (i.e., in a clockwise direction in FIG. 4 in this particular embodiment, as indicated by arrows in FIG. 4).

As shown in FIGS. 1 and 3, a nozzle needle 35, which serves as a valve member, is reciprocably and coaxially received radially inward of the housing 11, the nozzle holder 20 and the valve body 21. An upstream end of the nozzle needle 35 is connected to the movable core 18 and can reciprocate together with the movable core 18. An engaging portion 36, which is provided in a downstream end of the nozzle needle 35, is seatable against the valve seat 24 of the valve body 21.

An adjusting pipe 32 is press fitted radially inward of the stationary core 15. A spring 38 has one end engaged with the adjusting pipe 32 and the other end engaged with the movable core 18. The spring 38 urges the movable core 18 and the nozzle needle 35 toward the valve seat 24. By adjusting an amount of insertion depth of the adjusting pipe 32, a load of the spring 38 applied to the movable core 18 and the nozzle needle 35 can be changed.

As shown in FIG. 1, a filter 39 is arranged upstream of the stationary core 15 and removes debris and dust from fuel supplied to the injector 10 through a fuel inlet 16. The fuel supplied into the housing 11 through the fuel inlet 16 passes the filter 39, a fuel passage 31, which is formed radially inward of the adjusting pipe 32, and a fuel passage 29, which is formed radially inward of the stationary core 15. Then, the fuel is supplied into a fuel passage 28, which is formed radially inward of the movable core 18. Thereafter, the fuel in the fuel passage 28 passes through the drain hole 19, which communicates between inside and outside of the movable core 18. Then, the fuel is supplied into a fuel passage 25 defined between the housing 11 and the nozzle needle 35. Next, the fuel is supplied into the fuel passage 22 formed between the valve body 21 and the nozzle needle 35 through a fuel passage 26, which is formed between the nozzle holder 20 and the nozzle needle 35.

Next, operation of the injector 10 will be described.

When the power supply to the coil 41 is turned off, the movable core 18 and the nozzle needle 35 are moved toward the valve seat 24 by the urging force of the spring 38. Thus, the engaging portion 36 of the nozzle needle 35 is seated against the valve seat 24. As a result, fuel injection from each injection hole 57 is stopped.

Figure 6B:
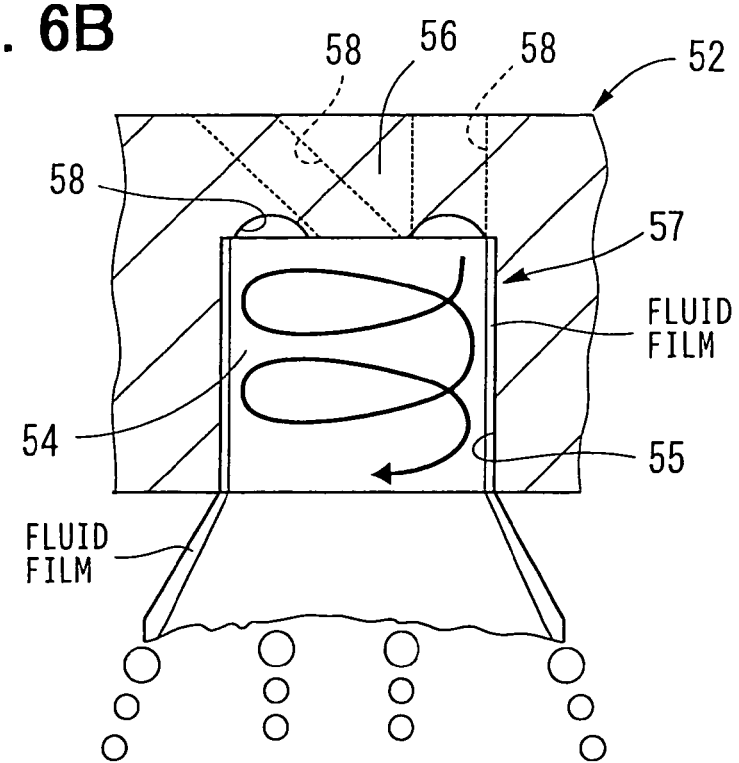
FIG. 6B is a cross sectional view along line VIB—VIB in FIG. 6A.

When the power supply to the coil 41 is turned on, magnetic attractive force, which attracts the movable core 18 toward the stationary core 15, is generated. When the movable core 18 is attracted to the stationary core 15 due to the magnetic attractive force, the nozzle needle 35 is also moved toward the stationary core 15. Thus, the engaging portion 36 of the nozzle needle 35 is lifted away from the valve seat 24. Then, fuel, which has passed through a space between the engaging portion 36 and the valve seat 24, flows out of the fuel passage 22 and is supplied into each first-side hole section 58 of the injection hole plate 50. The fuel supplied to each first-side hole section 58 is guided to the upstream end of the corresponding second-side hole section 54 along a peripheral wall surface of the first-side hole section 58. As a result, the fuel, which is guided into the second-side hole section 54 from the corresponding first-side hole section 58, forms the spiral swirl flow in the second-side hole section 54 and is discharged from the downstream end of the second-side hole section 54, as indicated in FIG. 6B.

In the injector 10, fuel, which is supplied from-the fuel passage 22, is guided into the second-side hole section 54 through the corresponding first-side hole sections 58, so that a relatively strong swirl flow is generated in the second-side hole section 54. Due to the strong swirl flow, the fuel is thinly spread over the wall surface 55 of the second-side hole section 54 and thus forms a thin fluid film, as shown in FIG. 6B. Then, the fuel in the thin fluid film form reaches the downstream end of the second-side hole section 54 and is discharged from the second-side hole section 54 while substantially maintaining the thin fluid film form. This allows effective spread of the fuel. Furthermore, in the injector 10, each second-side hole section 54 is formed as the cylindrical hole, so that it is possible to limit disturbance of the swirl fuel flow, which could be induced by impingement of fuel against the wall surface 55 of the second-side hole section 54. As a result, spread and dispersion of fuel are not disturbed. Therefore, the injector 10 can promote atomization of injected fuel.

Figure 7A:
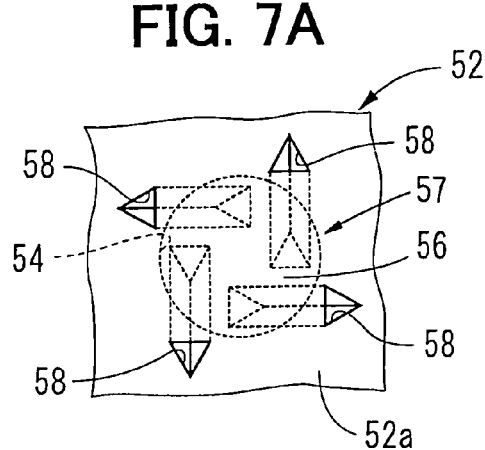
FIG. 7A is a partial enlarged plan view showing a modification of first-side hole sections of the injection hole plate of the first embodiment.
Figure 7B:
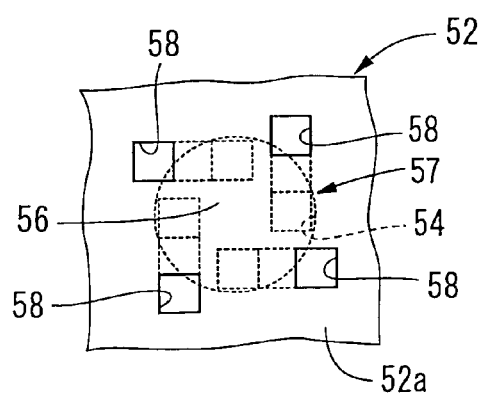
FIG. 7B is a partial enlarged plan view showing another modification of the first-side hole sections of the injection hole plate of the first embodiment.
Figure 7C:
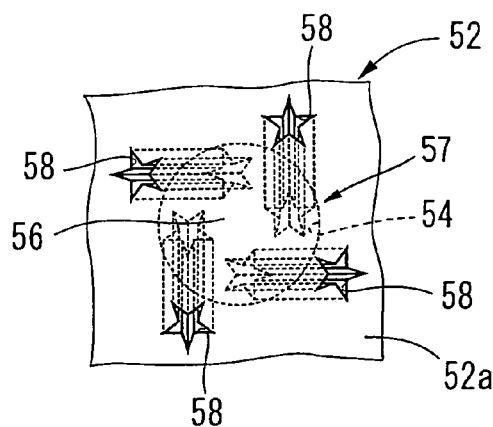
FIG. 7C is a partial enlarged plan view showing a further modification of the first-side hole sections of the injection hole plate of the first embodiment.

The shape of each first-side hole section 58 is not limited to the cylindrical passage that has the circular cross section. For example, as shown in FIGS. 7A and 7B, each first-side hole section 58 can have a polygonal cross section, such as a triangular cross section or a quadrangular cross section. Alternatively, each first-side hole section 58 can have a star shaped cross section, as shown in FIG. 7C. In any one of the above instances, the number of first-side hole sections 58 associated with the corresponding second-side hole section 54 can be any appropriate number, such as one or more than one.

Figure 8A:
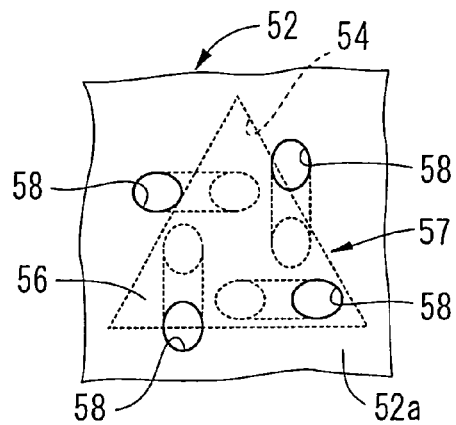
FIG. 8A is a partial enlarged plan view showing a modification of a second-side hole section of the injection hole plate of the injector of the first embodiment.
Figure 8B:
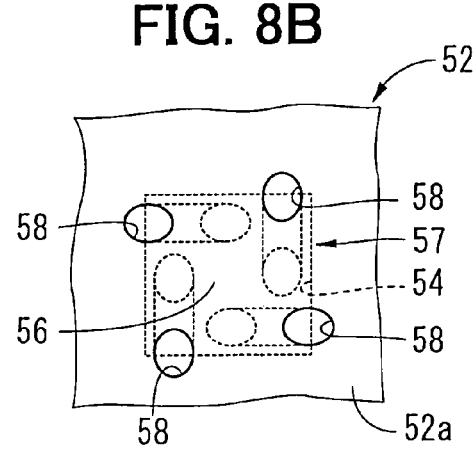
FIG. 8B is a partial enlarged plan view showing another modification of the second-side hole section of the injection hole plate of the injector of the first embodiment.
Figure 8C:
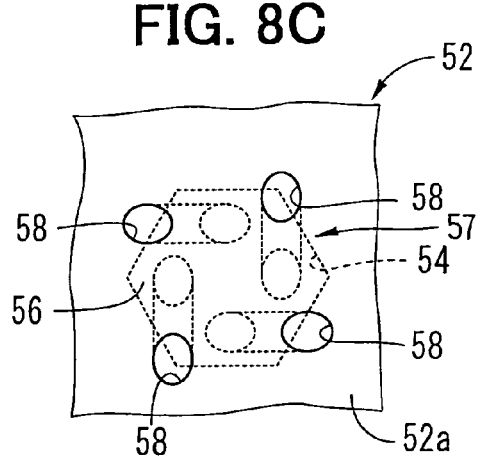
FIG. 8C is a partial enlarged plan view showing a further modification of the second-side hole section of the injection hole plate of the injector of the first embodiment.
Figure 9A:
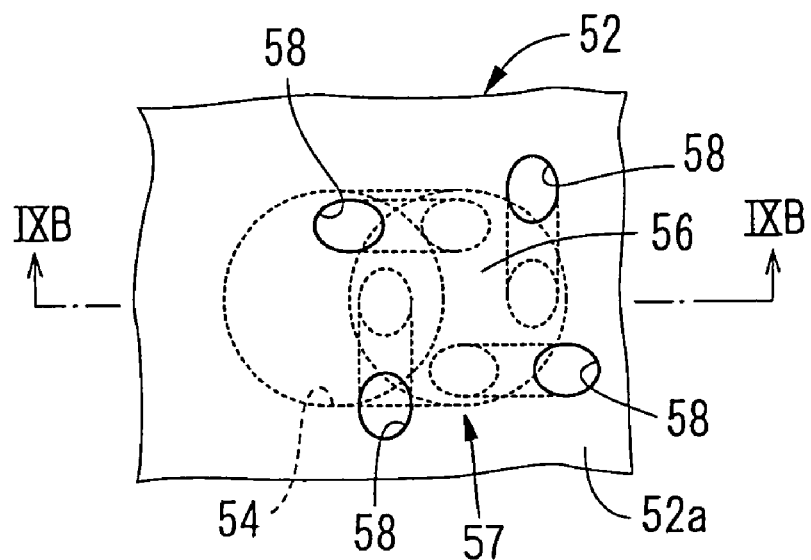
FIG. 9A is a partial enlarged plan view showing a modification of the injection hole plate of the injector of the first embodiment.
Figure 9B:
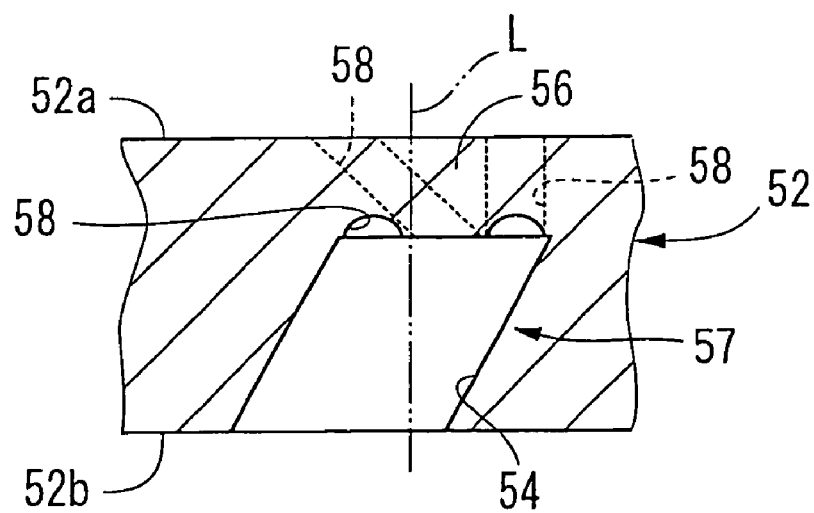
FIG. 9B is a cross sectional view along line IXB—IXB in FIG. 9A.

Furthermore, the shape of each second-side hole section 54 is not limited to the cylindrical hole that has the circular cross section. For example, as shown in FIGS. 8A–8C, each second-side hole section 54 can have a polygonal cross section, such as a triangular cross section, a quadrangular cross section or a hexagonal cross section. Alternatively, as shown in FIGS. 9A and 9B, each second-side hole section 54 can be an oblique cylindrical hole, which extends obliquely with respect to an axial line L that extends in a thickness direction of the base wall portion 52, i.e., the axial direction of the injector 10.

Second and Third Embodiments

Figure 10:
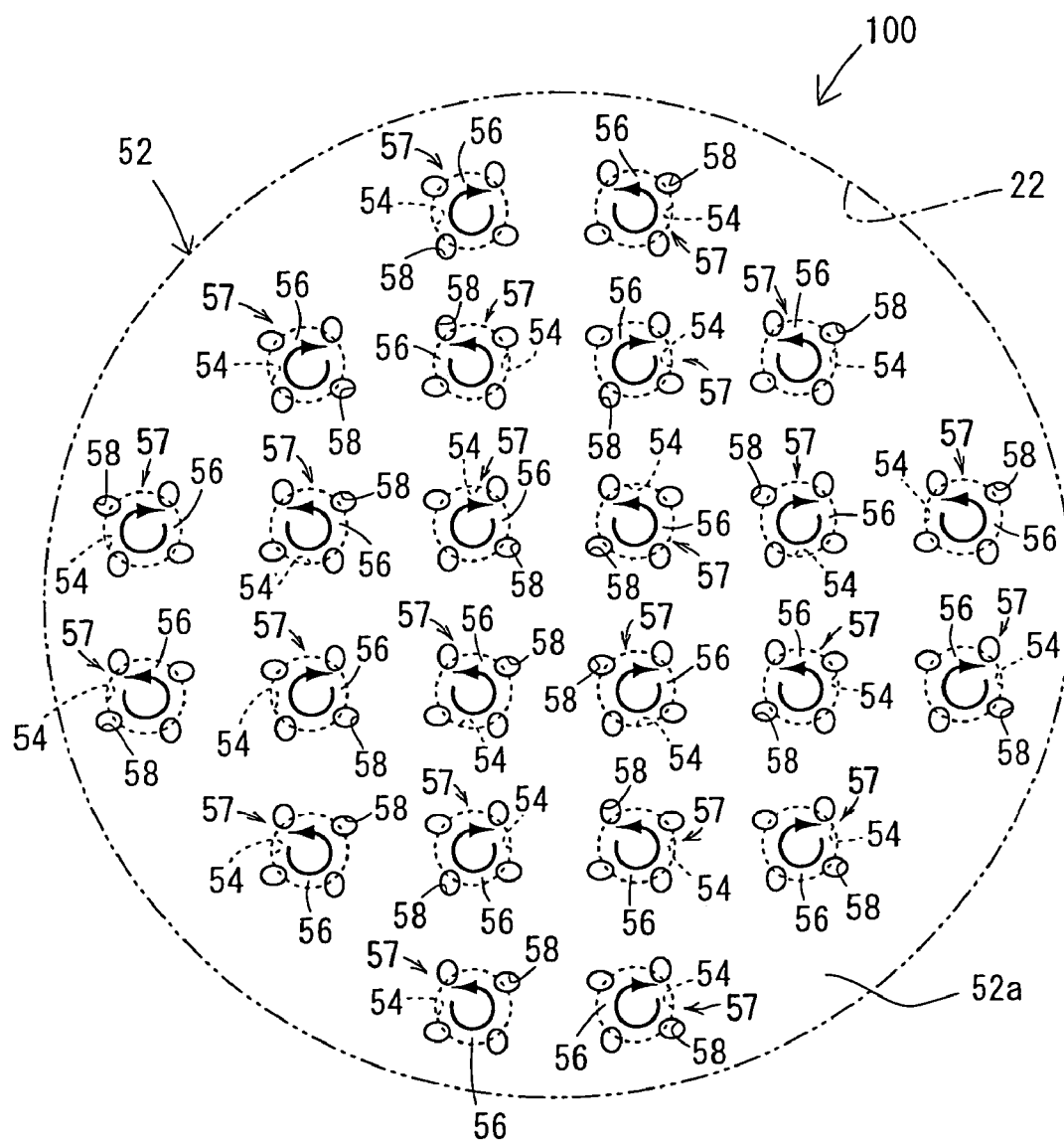
FIG. 10 is an enlarged plan view similar to FIG. 4, showing a base wall portion of an injection hole plate a second embodiment of the present invention.
Figure 11:
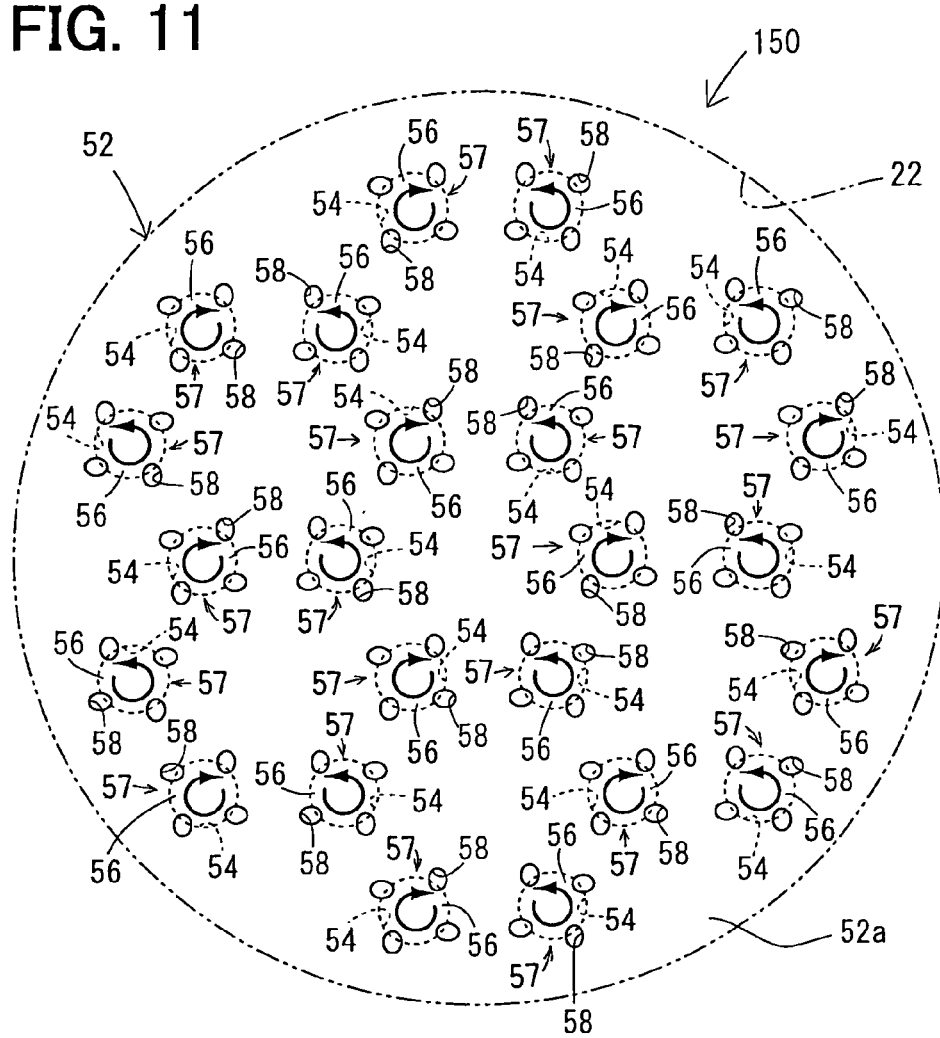
FIG. 11 is an enlarged plan view similar to FIG. 4, showing a base wall portion of an injection hole plate of a third embodiment of the present invention.

FIG. 10 shows an injection hole plate according to a second embodiment of the present invention, and FIG. 11 shows an injection hole plate according to a third embodiment of the present invention. Components similar to those of the first embodiment will be indicated by the same numerals.

With reference to FIG. 10, in an injector 100 of the second embodiment, an extending direction of each first-side hole section 58 associated with the corresponding second-side hole section 54 is set such that a swirl direction of one of each adjacent two second-side hole sections 54 is opposite to a swirl direction of the other one of each adjacent two second-side hole sections 54, as indicated by arrows in FIG. 10. With reference to FIG. 11, in an injector 150 of the third embodiment, the second-side hole section 54 of each injection hole 57 is positioned in a corresponding one of vertexes of an imaginary regular hexagonal plane tessellation, which is made of a plurality of regular hexagons. Furthermore, a direction of extension of each first-side hole section 58 associated with the corresponding second-side hole section 54 is set such that a swirl direction of one of each adjacent two second-side hole sections 54 is opposite to a swirl direction of the other one of each adjacent two second-side hole sections 54, as indicated by arrows in FIG. 11.

Figure 12:
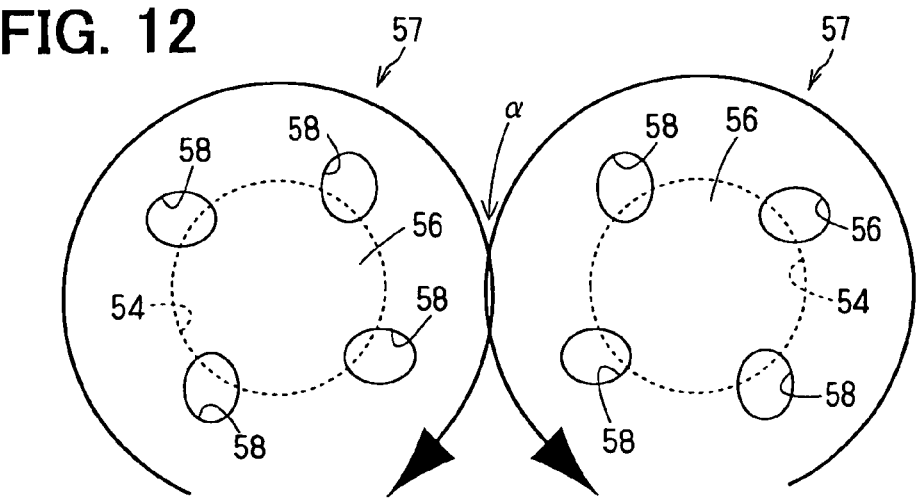
FIG. 12 is a schematic view showing fuel flows generated in the injector of each of the second and third embodiments.
Figure 13:
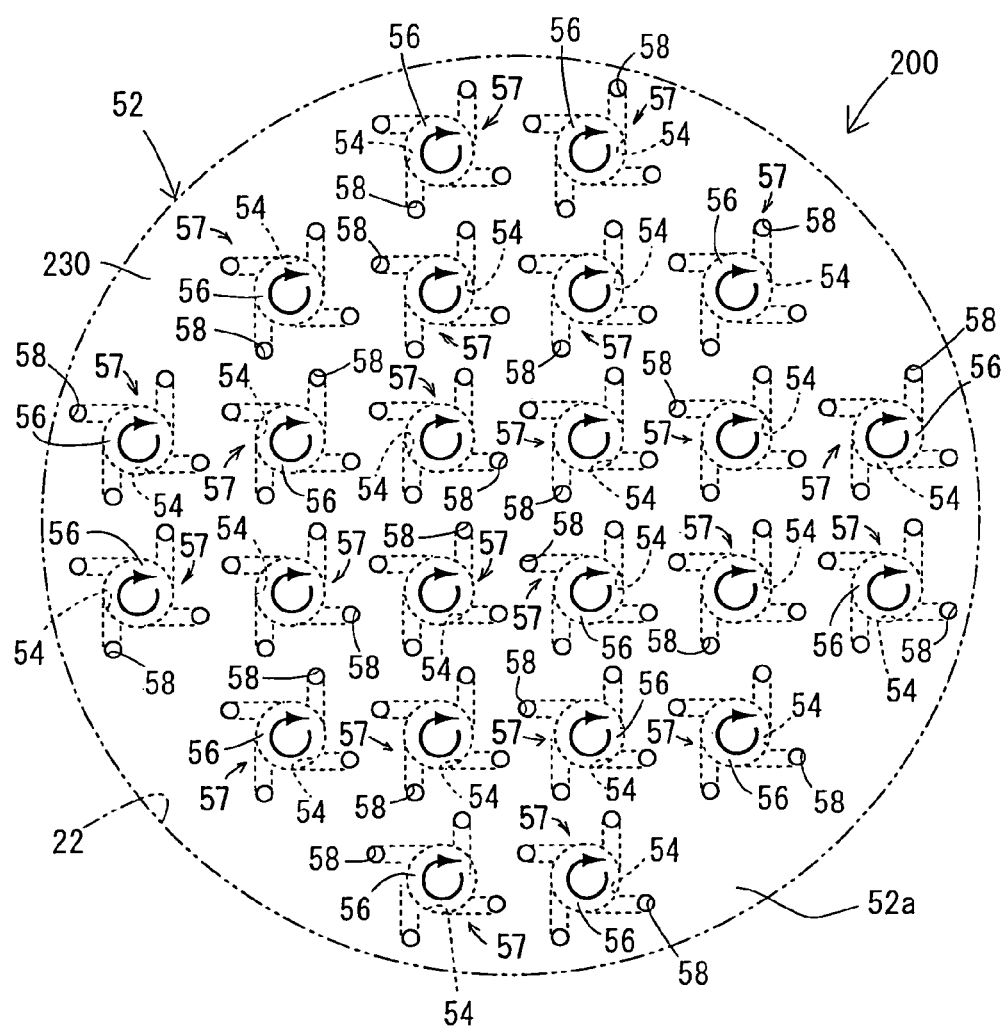
FIG. 13 is an enlarged plan view similar to FIG. 4, showing a base wall portion of an injection hole plate of a fourth embodiment of the present invention.
Figure 14A:
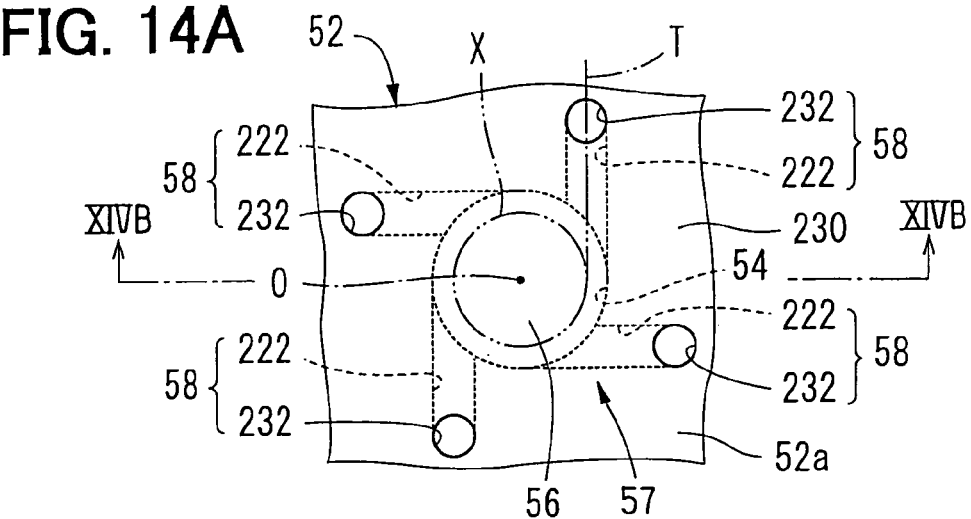
FIG. 14A is a partial enlarged plan view showing the injection hole plate of the injector of the fourth embodiment.
Figure 14B:
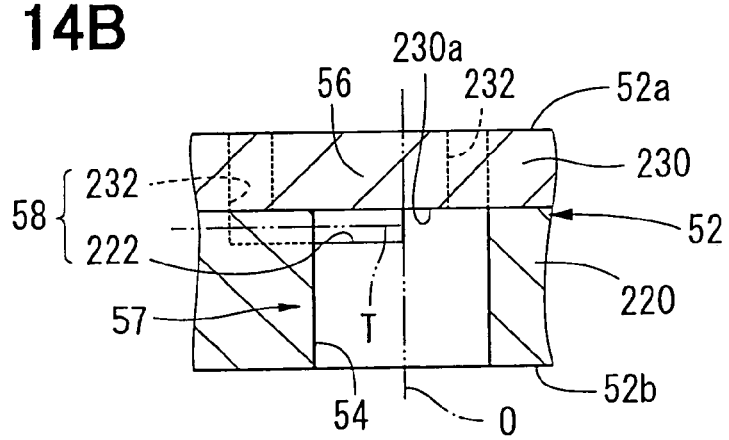
FIG. 14B is a cross sectional view along line XIVB—XIVB in FIG. 14A.
Figure 14C:
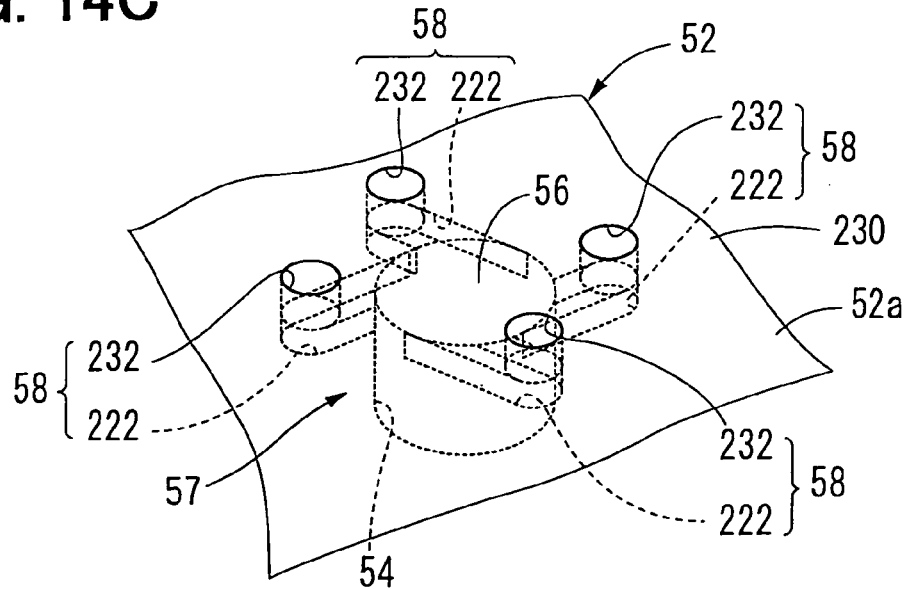
FIG. 14C is a partial perspective view showing the injection hole plate of the injector of FIGS. 14A and 14B.
Figure 15:
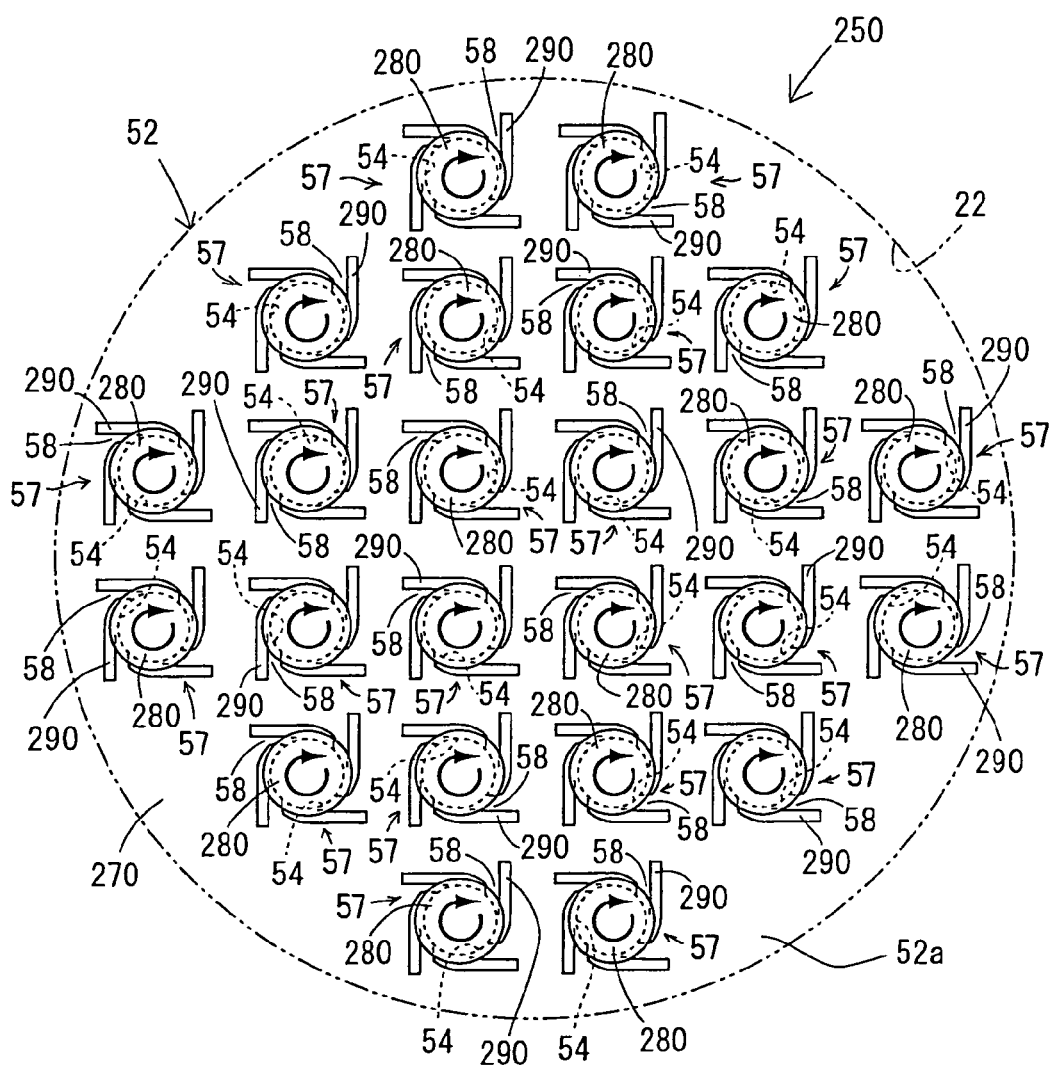
FIG. 15 is an enlarged plan view similar to FIG. 4, showing a base wall portion of an injection hole plate of a fifth embodiment of the present invention.
Figure 16A:
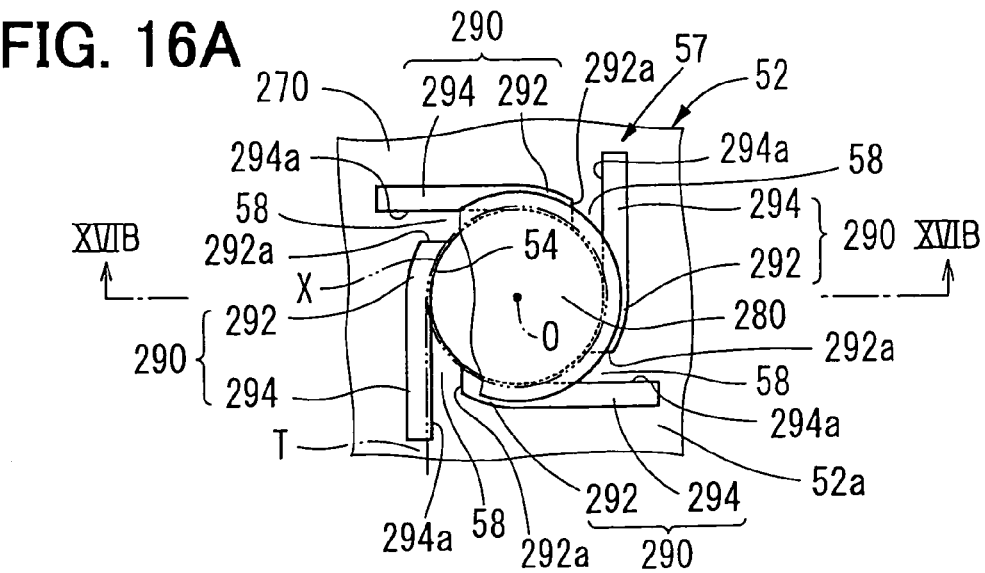
FIG. 16A is a partial enlarged plan view showing the injection hole plate of the injector of the fifth embodiment.
Figure 16B:
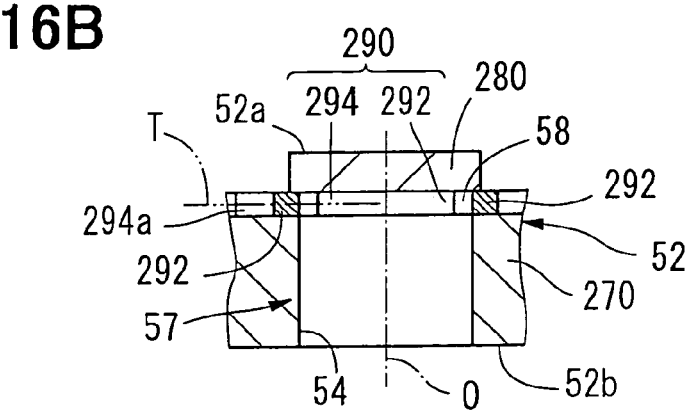
FIG. 16B is a cross sectional view along line XVIB—XVIB in FIG. 16A.
Figure 16C:
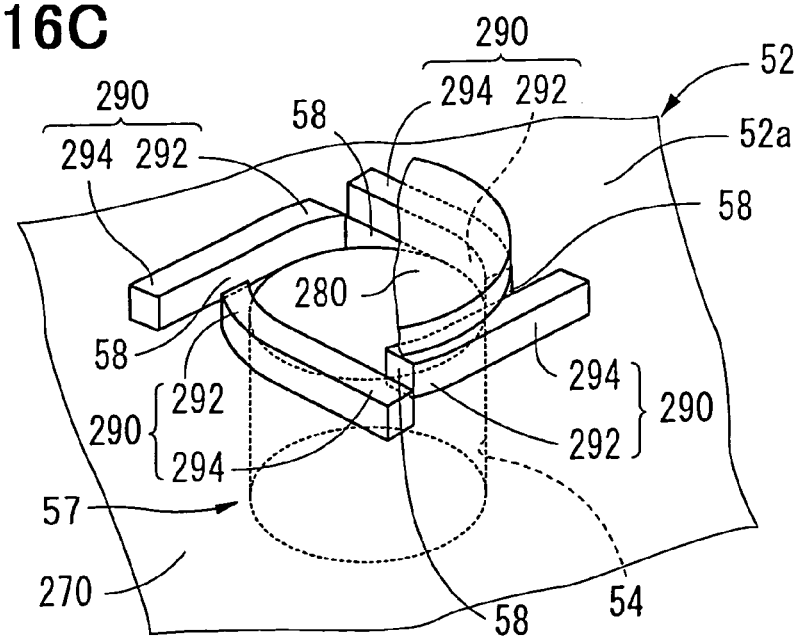
FIG. 16C is a partial enlarged perspective view showing the injection hole plate of the injector of FIGS. 16A and 16B.

In the above injectors 100, 150, as indicated by arrows in FIG. 12, a swirl fuel flow injected from the one of each adjacent two second-side hole sections 54 will meet and interact with a swirl fuel flow injected from the other one of each adjacent two second-side hole sections 54 in such a manner that the swirl flows are enhanced at a junction α between the swirl flows. Thus, dispersion and atomization of fuel discharged from each injection hole 57 will be further enhanced. The shapes of the second-side hole sections 54 and of the first-side hole sections 58 and the number of the first-side hole sections 58 associated with the corresponding second-side hole section 54 can be set in any appropriate manner like in the first embodiment.

Fourth Embodiment

FIGS. 13 and 14A–14C show an injection hole plate of an injector according to a fourth embodiment of the present invention. Components similar to those of the first embodiment will be indicated by the same numerals.

The injection hole plate 50 of the injector 200 of the fourth embodiment includes two members, i.e., first and second members 220, 230, which are joined together in the base wall portion 52 of the injection hole plate 50. The first member 220 forms a portion of the injection hole plate 50, which constitutes the downstream end 52b of the base wall portion 52. The second member 230 forms another portion of the injection hole plate 50, which constitutes the upstream end 52a of the base wall portion 52. The second member 230 further forms the peripheral wall portion 51 of the injection hole plate 50.

The first member 220 includes the second-side hole sections 54 and downstream side portions (second-side hole section side portions) 222 of the first-side hole sections 58 of each injection hole 57. The downstream side portion 222 of each first-side hole section 58 extends from a connecting point, at which the first-side hole section 58 and the second-side hole section 54 are connected one another, along the tangent line T to the imaginary circle X that is concentric with the inner circumference of the upstream end of the second-side hole section 54.

The second member 230 is arranged such that a first member side wall surface 230a of the second member 230 covers the upstream end of each second-side hole section 54 formed by the first member 220. Portions of the second member 230, each of which covers the corresponding second-side hole section 54, form the cover portions 56. Upstream side portions (fuel passage 22 side portions) 232 of the first-side hole sections 58 are formed in the second member 230. The upstream side portion 232 of each first-side hole section 58 is connected to the downstream side portion 222 of the first-side hole section 58 in such a manner that the upstream side portion 232 of each first-side hole section 58 is generally right angled relative to the downstream side portion 222 of the first-side hole section 58 and extends away from the corresponding second-side hole section 54.

In the injector 200 of the fourth embodiment, the first-side hole sections 58 associated with the corresponding second-side hole section 54 are arranged with rotational symmetry about a central axis O, which extends through the center of the imaginary circle X. Furthermore, these first-side hole sections 58 conduct supplied fuel into the corresponding second-side hole section 54 to generate a swirl flow, which flows in a single common swirl direction. Thus, advantages similar to those discussed in the first embodiment can be achieved. All of the swirl directions of the second-side hole sections 54 can be the same direction. Alternatively, the swirl direction of the one of each adjacent two second-side hole sections 54 can be opposite to a swirl direction of the other one of each adjacent two second-side hole sections 54. In the latter case, the advantages similar to those discussed in the second embodiment can be achieved. The shapes of the second-side hole sections 54 and of the first-side hole sections 58 and the number of the first-side hole sections 58 associated with the corresponding second-side hole section 54 can be set in any appropriate manner like in the first embodiment.

Fifth Embodiment

FIGS. 15 and 16A–16C show an injection hole plate of an injector according to a fifth embodiment of the present invention. Components similar to those of the first embodiment will be indicated by the same numerals.

An injector 250 of the fifth embodiment includes the injection hole plate 50. The injection hole plate 50 includes a plurality of members, which are connected together in the base wall portion 52 of the injection hole plate 50 and includes a main body member 270, a plurality of cover members 280 and a plurality of guide members 290. The main body member 270 forms the downstream end 52b and part of the upstream end 52a of the base wall portion 52. The main body member 270 also forms the peripheral wall portion 51 of the injection hole plate 50. Each cover member 280 forms a corresponding portion of the upstream end 52a of the base wall portion 52. Each guide member 290 forms a corresponding portion of the injection hole plate 50, which is held between the main body member 270 and the corresponding cover member 280.

The second-side hole sections 54 except the upstream ends of the second-side hole sections 54 are formed in the main body member 270.

The guide members 290, which are associated with the corresponding second-side hole section 54, form the upstream end of the second-side hole section 54 in corporation with the corresponding cover member 280. Specifically, each guide member 290 is formed as a quadrangular prism and includes a first lengthwise part 292 and a second lengthwise part 294. The first lengthwise part 292 of each guide member 290 extends along a portion of the corresponding imaginary circle X, and the second lengthwise part 294 of each guide member 290 extends along the corresponding tangent line T to the imaginary circle X. The guide members (the number of the guide members 290 is four in this embodiment 290 associated with the corresponding second-side hole section 54 are arranged with rotational symmetry about the central axis O, which extends through the center of the imaginary circle X. The first lengthwise parts 292 of these guide members 290 are arranged coaxially with the imaginary circle X. At each injection hole 57, an injection hole side wall surface 294a of the second lengthwise part 294 of each guide member 290 is spaced from and is opposed to an end surface 292a of the first lengthwise part 292 of the adjacent guide member 290. A first-side hole section 58 is formed along the injection hole side wall surface 294a of the second lengthwise part 294 of each guide member 290. Specifically, the first-side hole sections 58 are provided to the corresponding second-side hole section 54 and extend along the corresponding tangent line T to the imaginary circle X. The first-side hole sections 58 associated with the corresponding second-side hole section 54 are arranged with rotational symmetry about the central axis O, which extends through the center of the imaginary circle X, to form swirl fuel flows, which flow in a common single direction in the second-side hole section 54. The swirl directions of the swirl fuel flows of the second-side hole sections 54 can be the same. Alternatively, the swirl direction of the one of each adjacent two second-side hole sections 54 can be opposite to the swirl direction of the other one of each adjacent two second-side hole sections 54. In the latter case, the advantages similar to those discussed in the second embodiment can be achieved.

The cover members 280 are provided to the injection holes 57, respectively. An outer diameter of each cover member 280 is larger than an inner diameter of the upstream end of the corresponding second-side hole section 54 to cover the upstream end of the second-side hole section 54. In the present embodiment, each cover member 280 forms the cover portion.

The fuel passed through the fuel passage 22 is guided through the space defined between adjacent cover members 280 and is supplied into the respective first-side hole sections 58 to form the relatively strong swirl fuel flow in the second-side hole sections 54. Thus, advantages similar to those of the first embodiment can be achieved.

As discussed above, the second-side hole sections 54 can be covered by the cover members 280, respectively. Alternatively, all the second-side hole sections 54 can be covered by a single cover member. In this case, portions of the single cover member, which cover the second-side hole sections 54, form the cover portions. The shapes of the second-side hole sections 54 and of the first-side hole sections 58 and the number of the first-side hole sections 58 associated with the corresponding second-side hole section 54 can be set in any appropriate manner like in the first embodiment.

Sixth Embodiment

Figure 17:
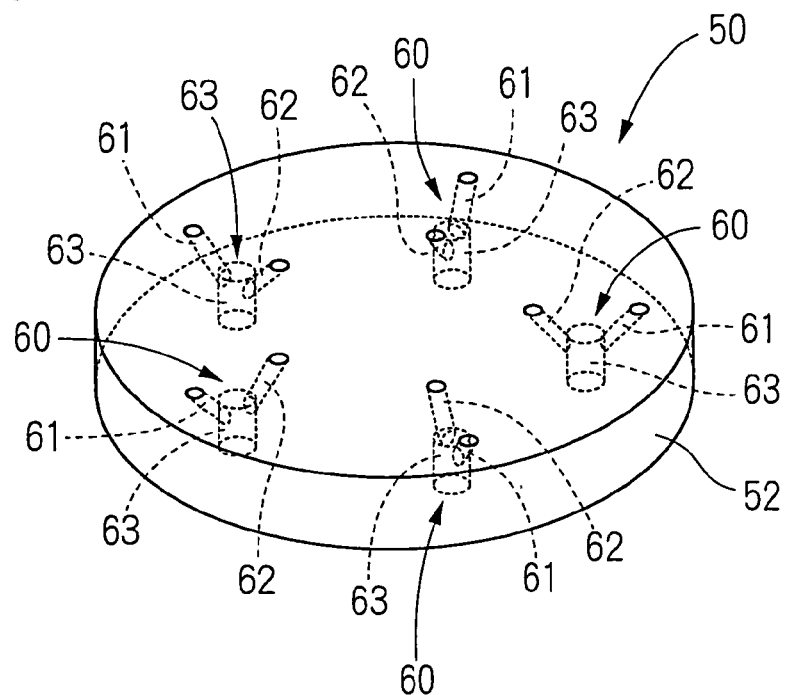
FIG. 17 is a schematic partial perspective view showing a base wall portion of an injection hole plate of a sixth embodiment of the present invention.

A sixth embodiment of the present invention will be described with reference to FIGS. 17–19.

In the present embodiment, each injection hole 60 includes two first-side hole sections 61, 62 and one second-side hole section 63. The first-side hole sections 61, 62 are provided on the upstream side (i.e., the valve seat 24 side) of the injection hole plate 50, and the second side hole section 63 is formed on the downstream side (i.e., the side opposite from the valve seat 24) of the injection hole plate 50. In the present embodiment, the two first-side hole sections 61, 62 are connected to the second-side hole section 63. As shown in FIG. 18, an upstream end of each first-side hole section 61, 62 is opened in an upstream end 52a of the base wall portion 52 of the injection hole plate 50 (hereinafter, simply referred to as the upstream end 52a of the injection hole plate 50). Thus, the upstream end of each first-side hole section 61, 62 serves as a fuel inlet 60a, through which fuel is supplied to the injection hole 60. A downstream end of the second-side hole section 63 is opened in a downstream end 52b of the base wall portion 52 of the injection hole plate 50 (hereinafter, simply referred to as the downstream end 52b of the injection hole plate 50). Thus, the downstream end of the second-side hole section 63 serves as a fuel outlet 60b.

Each first-side hole section 61, 62 forms a predetermined angle relative to a direction parallel to an axis of the injection hole plate 50, which is parallel to a thickness direction of the base wall portion 52 of the injection hole plate 50, i.e., an axial direction of the injector 10. Thus, the first-side hole sections 61, 62 are oblique to the direction parallel to the axis of the injection hole plate 50. An angle, which is defined between the first-side hole section 61 and the direction parallel to the axis of the injection hole plate 50, is substantially the same as an angle, which is defined between the first-side hole section 62 and the direction parallel to the axis of the injection hole plate 50. In some cases, the angle, which is defined between the first-side hole section 61 and the direction parallel to the axis of the injection hole plate 50 can differ from the angle, which is defined between the first-side hole section 62 and the direction parallel to the axis of the injection hole plate 50. The first-side hole sections 61, 62 extend from the upstream end 52a of the injection hole plate 50 toward the downstream end 52b of the injection hole plate 50. With this arrangement, the first-side hole sections 61, 62 communicate between the upstream end 52a of the injection hole plate 50 and the second-side hole section 63. The downstream ends of the first-side hole sections 61, 62 are communicated with a periphery of an upstream end 63b of the second-side hole section 63 generally in the thickness direction of the base wall portion 52 of the injection hole plate 50, i.e., in a direction generally perpendicular to a plane of the base wall portion 52 of the injection hole plate 50. Each first-side hole section 61, 62 is formed as a cylindrical hole that has a generally constant inner diameter along its length between the upstream end 60a of the first-side hole section 61, 62 and the second-side hole section 63.

The second-side hole section 63 is generally parallel to the axis of the injection hole plate 50 and extends from the downstream end 52b of the injection hole plate 50 to an axially intermediate point of the injection hole plate 50 between the downstream end 52b and the upstream end 52a of the injection hole plate 50. The first-side hole sections 61, 62 are connected to the periphery of the upstream end 63b of the second-side hole section 63. The second-side hole section 63 has a generally constant inner diameter along its length. The second-side hole section 63 extends generally parallel to the axis of the injection hole plate 50. Thus, the second-side hole section 63 is connected to each first-side hole section 61, 62 at the predetermined angle.

Figure 18:
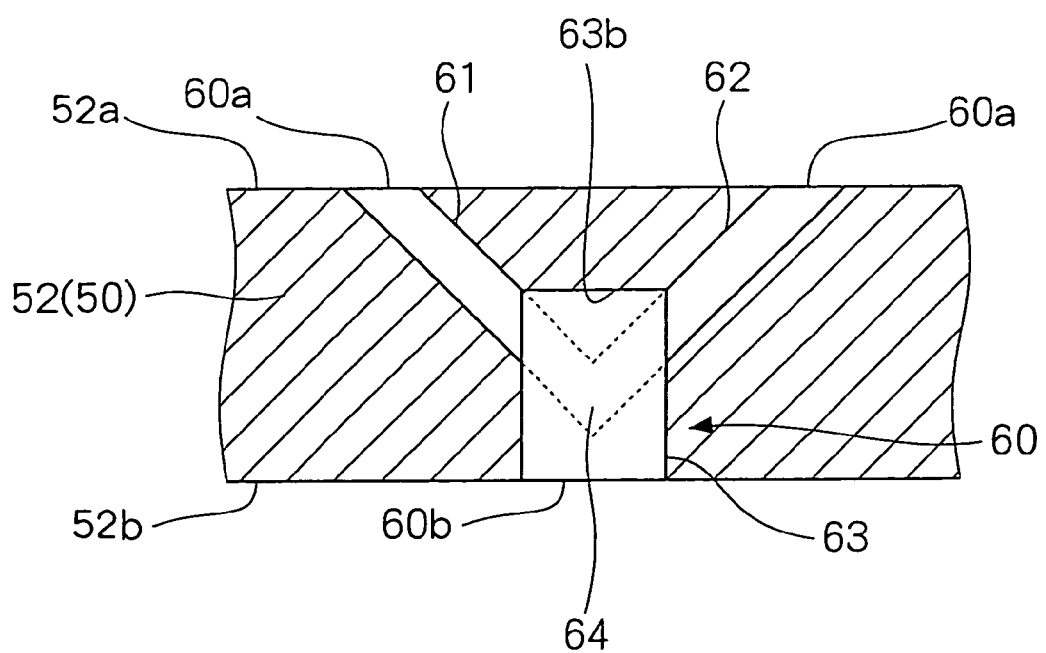
FIG. 18 is a partial enlarged cross sectional view showing an injection hole of the injection hole plate of the sixth embodiment.

As shown in FIG. 18, in an interior of the second-side hole section 63, an imaginary cylindrical portion (or an imaginary extension line), which extends parallel to a central axis of the first-side hole section 61 from the downstream end of the first-side hole section 61 and is indicated by corresponding dotted lines in FIG. 18, meets with an imaginary cylindrical portion (or an imaginary extension line), which extends parallel to a central axis of the first-side hole section 62 from the downstream end of the first-side hole section 62 and is indicated by corresponding dotted lines in FIG. 18. A conjunction between the imaginary cylindrical portion of the first-side hole section 61 and the imaginary cylindrical portion of the first-side hole section 62 forms a collision portion 64, at which a fuel flow discharged from the first-side hole section 61 collides with a fuel flow discharged from the first-side hole section 62.

Fuel, which has passed a space between the valve seat 24 of the valve body 21 and the engaging portion 36 of the nozzle needle 35, is supplied into the first-side hole sections 61, 62 through the corresponding fuel inlets 60a, which are opened in the upstream end 52a of the injection hole plate 50. Fuel, which has entered into each first-side hole section 61, 62, is then supplied to the second-side hole section 63. Since the imaginary cylindrical portion of the first-side hole section 61 and the imaginary cylindrical portion of the first-side hole section 62 meet with each other in the second-side hole section 63, the fuel flow supplied from the first-side hole section 61 into the second-side hole section 63 collides with the fuel flow supplied from the first-side hole section 62 into the second-side hole section 63 in the collision portion 64. Due to the collision between the fuel flow supplied from the first-side hole section 61 to the second-side hole section 63 and the fuel flow supplied from the first-side hole section 62 to the second-side hole section 63, turbulence is created in the fuel flow in the second-side hole section 63.

In the second-side hole section 63, the turbulent fuel flow, which is generated by the collision between the fuel flow from the first-side hole section 61 and the fuel flow from the first-side hole section 62, is then conducted to the fuel outlet 60b. Since the turbulent fuel flow is guided along the second-side hole section 63, the fuel is discharged from the fuel outlet 60b in a direction generally along an imaginary cylindrical portion, which extends downwardly from the second-side hole section 63. In this way, the fuel is discharged in the predetermined direction.

In the sixth embodiment, the fuel flow supplied from the first-side hole section 61 and the fuel flow supplied from the first-side hole section 62 collide and merge with one another at the collision portion 64 in the second-side hole section 63. Thus, turbulence is created in the merged fuel flow in the collision portion 64, resulting in agitation of the fuel flow. The turbulent fuel flow thus generated is guided along the second-side hole section 63 and is injected from the fuel outlet 60b of the injection hole 60. As a result, the fuel is injected while creating the complicated turbulent fuel flow. Therefore, further division or miniaturization of fuel droplets is promoted, and further atomization of the fuel is achieved.

In the sixth embodiment, the fuel flow from the first-side hole section 61 and the fuel flow form the first-side hole section 62 collide with one another in the collision portion 64 and form the turbulent fuel flow, which is guided by the second-side hole section 63 and is discharged from the fuel outlet 60b.

For example, when the fuel flow from the first-side hole section 61 and the fuel flow from the first-side hole section 62 are not guided by the second-side hole section 63, the collision between the fuel flow from the first-side hole section 61 and the fuel flow from the first-side hole section 62 and the consequent discharge of the collided fuel from the injector 10 will cause formation of irregular spray patterns of fuel mist. Thus, the injecting direction and the spray pattern of fuel mist may vary from injection to injection.

Contrary to this, in the sixth embodiment, the turbulent fuel flow, which is formed upon the collision of the two fuel flows in the collision portion 64 and is thus agitated, is guided by the second-side hole section 63. Thus, the generally constant injecting direction of the fuel, which is guided by the second-side hole section 63, can be achieved. Furthermore, the fuel flow is regulated by the second-side hole section 63. As a result, unnecessary scattering of fuel can be limited, and substantial variations in the spray pattern of fuel mist can be reduced. Therefore, the stable desired spray pattern of fuel mist can be formed in a predetermined location.

Figure 19:
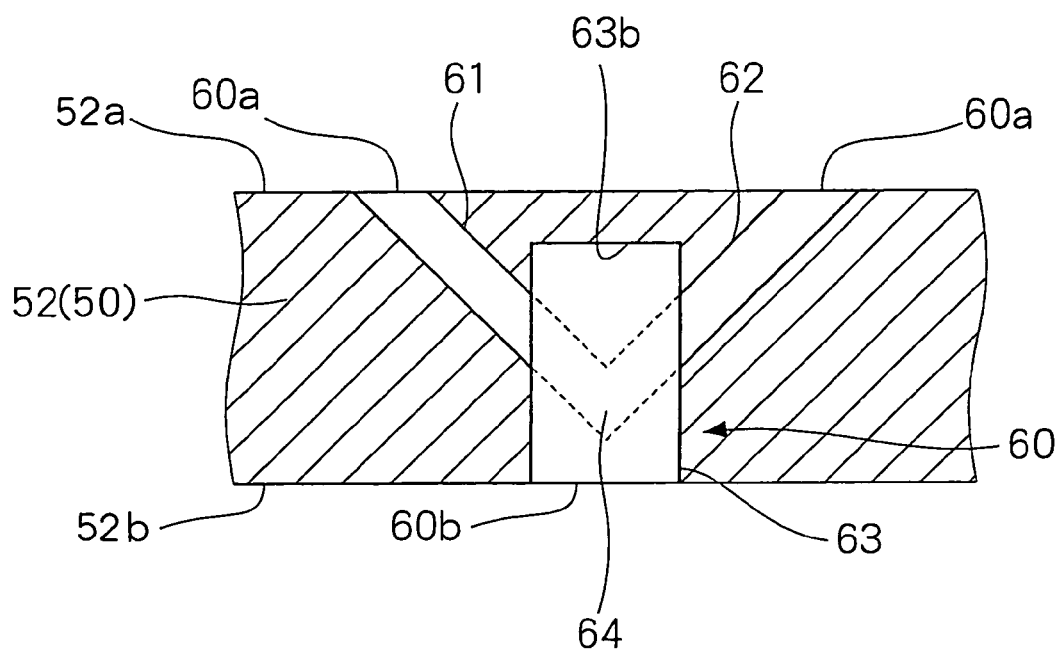
FIG. 19 is a partial enlarged cross sectional view similar to FIG. 18, showing a modification of the injection hole of the injector of the sixth embodiment.

FIG. 19 shows a modification of the sixth embodiment.

In the sixth embodiment, the downstream ends of the first-side hole sections 61, 62 are communicated with the second-side hole section 63 at the upstream end 63b side of the second-side hole section 63 located adjacent the upstream end 63b of the second-side hole section 63. Alternatively, the downstream ends of the first-side hole sections 61, 62 can be communicated with the second-side hole section 63 at an axially intermediate point of the second-side hole section 63 located between the upstream end 63b of the second-side hole section 63 and the fuel outlet 60b, as shown in FIG. 19.

Even in this modification, the fuel flow from the first-side hole section 61 and the fuel flow from the first-side hole section 62 collide and merge with one another in the collision portion 64 in the second-side hole section 63. Furthermore, the merged fuel flow is guided by the second-side hole section 63 and is injected from the fuel outlet 60b. Thus, further atomization of fuel is promoted, and the stable desired spray pattern of fuel mist can be formed in a predetermined location.

Seventh Embodiment

Figure 20:
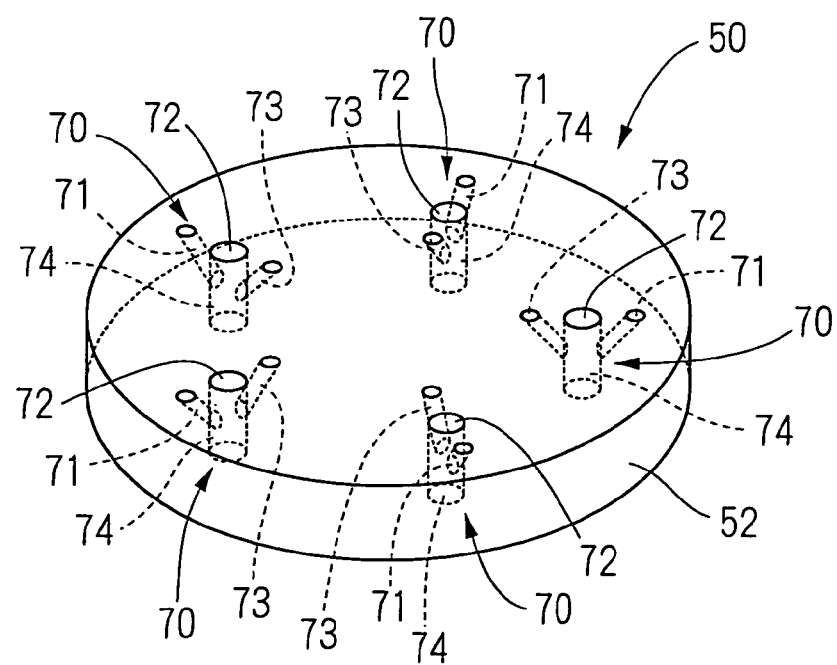
FIG. 20 is a schematic partial perspective view showing a base wall portion of an injection hole plate of an injector according to a seventh embodiment of the present invention.
Figure 21:
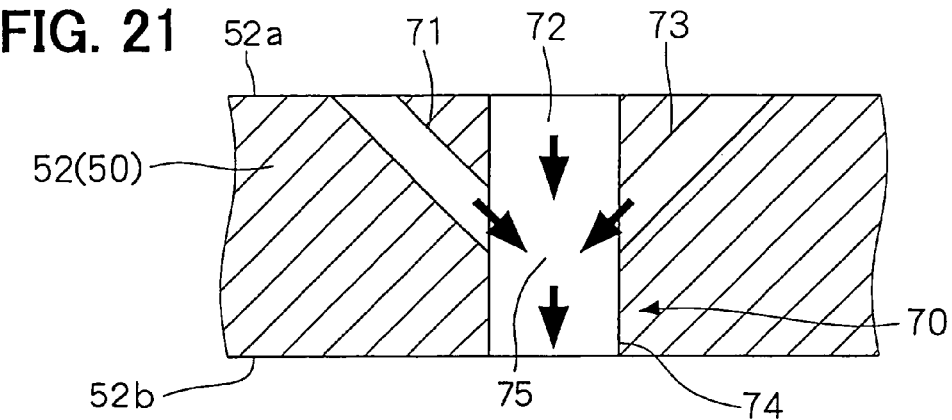
FIG. 21 is a partial enlarged cross sectional view showing an injection hole of the injection hole plate of the seventh embodiment.

FIGS. 20 and 21 show a base wall portion 52 of an injection hole plate 50 according to a seventh embodiment of the present invention. Components similar to those discussed in the sixth embodiment will be indicated by the same numerals and will not be described further.

In the seventh embodiment, as shown in FIGS. 20 and 21, each injection hole 70 includes three first-side hole sections 71–73 and one second-side hole section 74. That is, the three first-side hole sections 71–73 are connected to the second-side hole section 74 at a collision portion 75. Among the three first-side hole sections 71–73, the first-side hole sections 71, 73 form the predetermined angle relative to the direction parallel to the axis of the injection hole plate 50 like in the sixth embodiment. On the other hand, the firs-side hole section (the first one of the first-side hole sections) 72 is parallel to the axis of the injection hole plate 50, and the first-side hole section 72 and the second-side hole section 74 extend along a common straight line. Thus, the first-side hole section 72 and the second-side hole section 74, which have generally the same inner diameter, are integrated together to penetrate through the injection hole plate 50 in the thickness direction of base wall portion 52 of the injection hole plate 50, i.e., in the direction generally perpendicular to the plane of the base wall portion 52 of the injection hole plate 50. The first-side hole sections 71, 73 are communicated with the second-side hole section 74, which is integrated with the first-side hole section 72.

A fuel flow, which has been supplied to the first-side hole section 71 or to the first-side hole section 73, is guided toward the second-side hole section 74. Then, the fuel flow from the first-side hole section 71 and the fuel flow from the first-side hole section 73 impinge on an outer peripheral part of the fuel flow, which is supplied linearly from the first-side hole section 72 to the second-side hole section 74. Thus, due to the impingement of the fuel flow supplied from the first-side hole section 71 and the fuel flow supplied from the first-side hole section 73, turbulence is created in the fuel flow supplied from the first-side hole section 72 to the second-side hole section 74 in the collision portion 75.

In the seventh embodiment, among the three first-side hole sections 71–73, the first-side hole section 72 extends along the common straight line, along which the second-side hole section 74 also extends. With this arrangement, a sufficient flow rate is achieved in each injection hole 70, and the turbulence is created in the fuel flow in the injection hole 70 like in the sixth embodiment. Thus, atomization of fuel can be promoted. Furthermore, the fuel flow after the collision is guided by the second-side hole section 74 and is then injected from the second-side hole section 74. As a result, the stable desired spray pattern of fuel mist can be formed in a predetermined location.

Eighth Embodiment

Figure 22:
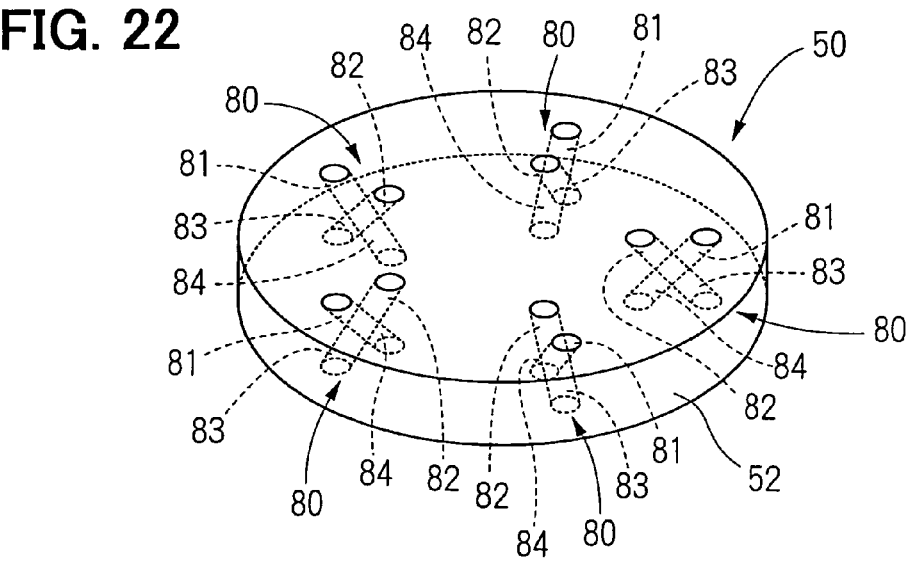
FIG. 22 is a schematic partial perspective view showing a base wall portion of an injection hole plate of an eighth embodiment of the present invention.
Figure 23:
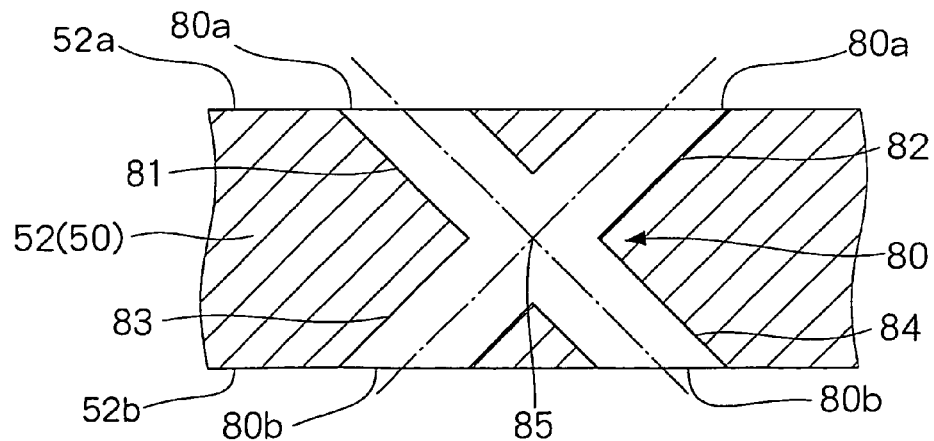
FIG. 23 is a partial enlarged cross sectional view showing an injection hole of the injection hole plate of the eighth embodiment.

FIGS. 22 and 23 show a base wall portion 52 of an injection hole plate 50 according to a eighth embodiment of the present invention. Components similar to those of the sixth embodiment will be indicated by the same numerals and will not be described further.

In the eighth embodiment, as shown in FIGS. 22 and 23, each injection hole 80 includes two first-side hole sections 81, 82 and two second-side hole sections 83, 84. Each of the first-side hole sections 81, 82 and the second-side hole sections 83, 84 forms a corresponding predetermined angle relative to the direction parallel to the axis of the injection hole plate 50. Furthermore, the first-side hole sections 82, 83 and the second-side hole sections 83, 84 are connected together at one point. The point, at which the first-side hole sections 82, 83 and the second-side hole sections 83, 84 are connected together, forms a collision portion 85. That is, the first-side hole section 81, the first-side hole section 82, the second-side hole section 83 and the second-side hole section 84 radially outwardly extend from the collision portion 85. With this arrangement, each of an upstream end of the first-side hole section 81 and an upstream end of the first-side hole section 82 located in the upstream end 52a of the injection hole plate 50 forms a fuel inlet 80a, as shown in FIG. 23. Furthermore, each of a downstream end of the second-side hole section 83 and a downstream end of the second-side hole section 84 located in the downstream end 52b of the injection hole plate 50 forms a fuel outlet 80b.

In the eighth embodiment, the angle of the first-side hole section 81 relative to the direction parallel to the axis of the injection hole plate 50 is generally the same as the angle of the second-side hole section 84 relative to the direction parallel to the axis of the injection hole plate 50. Furthermore, the angle of the first-side hole section 82 relative to the direction parallel to the axis of the injection hole plate 50 is generally the same as the angle of the second-side hole section 83 relative to the direction parallel to the axis of the injection hole plate 50. Thus, the first-side hole section 81 and the second-side hole section 84 extend along a corresponding common straight line, and the first-side hole section 82 and the second-side hole section 83 extend along a corresponding common straight line.

A fuel flow supplied to the first-side hole section 81 through the fuel inlet 80a and a fuel flow supplied to the first-side hole section 82 through the fuel inlet 80a collide with one another at the collision portion 85 where the first-side hole section 81 and the first-side hole section 82 meet one another. More specifically, the fuel flow in the first-side hole section 81 and the fuel flow in the first-side hole section 82 collide with one another at the connection (i.e., the collision portion 85) between the first-side hole sections 81, 82 and the second-side hole sections 83, 84. The fuel flows, which collide with one another at the collision portion 85 and thus create turbulence therein, are then supplied to the second-side hole sections 83, 84 while maintaining the turbulence. Thereafter, the turbulent fuel flow guided in each second-side hole section 83, 84 is injected from the corresponding fuel outlet 80b.

In the eighth embodiment, the fuel flow in the first-side hole section 81 and the fuel flow in the first-side hole section 82 collide with one another, so that the atomization of fuel is promoted like in the sixth embodiment. Furthermore, upon the collision, the fuel is guided into the second-side hole sections 83, 84 and is injected therefrom. Thus, the stable desired spray pattern of fuel mist can be formed in a predetermined location.

Ninth Embodiment

Figure 24:
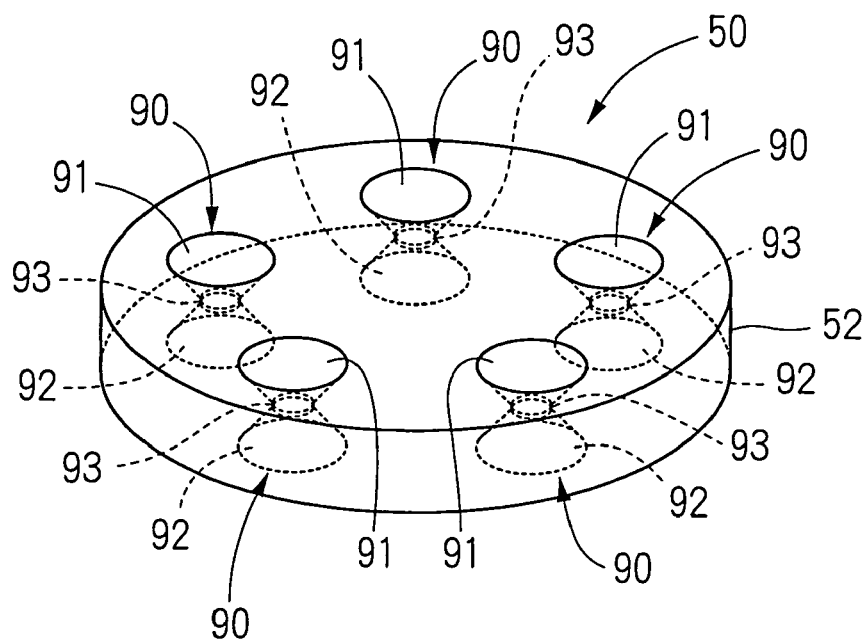
FIG. 24 is a schematic partial perspective view showing a base wall portion of an injection hole plate of a ninth embodiment of the present invention.
Figure 25:
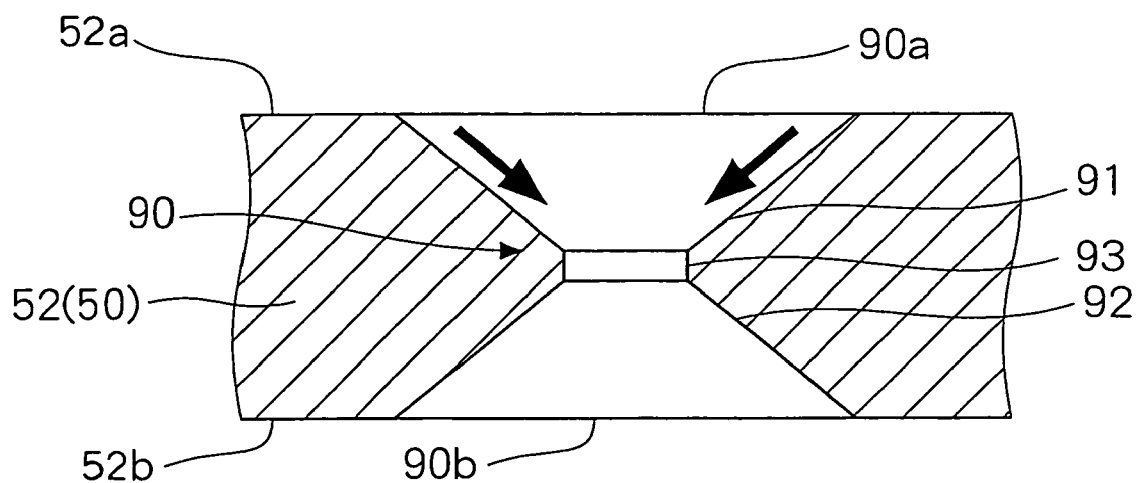
FIG. 25 is a partial enlarged cross sectional view showing an injection hole of the injection hole plate of the ninth embodiment.

FIGS. 24 and 25 show a base wall portion 52 of an injection hole plate 50 according to a ninth embodiment of the present invention. Components similar to those of the sixth embodiment will be indicated by the same numerals and will not be described further.

In the ninth embodiment, as shown in FIGS. 24 and 25, each injection hole 90 includes one first-side hole section 91 and one second-side hole section 92. The first-side hole section 91 and the second-side hole section 92 communicate with each other through a collision portion 93. As shown in FIG. 25, the first-side hole section 91 has a progressively decreasing inner diameter, which progressively decreases from a fuel inlet 90a opened in the upstream end 52a of the injection hole plate 50 to the collision portion 93. Thus, the first-side hole section 91 is formed into a generally conical frustum shape. On the other hand, the second-side hole section 92 has a progressively increasing inner diameter, which progressively increases from the collision portion 93 to a fuel outlet 90b opened in the downstream end 52b of the injection hole plate 50. Thus, the second-side hole section 92 is formed into a generally conical frustum shape, which is inverted with respect to the conical frustum shape of the first-side hole section 91. The collision portion 93 is formed into a cylindrical shape, which has a generally constant inner diameter in the axial direction along its length.

Fuel flows supplied into the first-side hole section 91 in the circumferential direction through the fuel inlet 90a are guided along an inner peripheral surface section of the injection hole plate 50, which forms the first-side hole section 91. Since the first-side hole section 91 has the progressively decreasing inner diameter, the fuel flows, which are guided along the inner peripheral surface section of the injection hole plate 50, collide with one another at the collision portion 93, which forms the downstream end of the first-side hole section 91. More specifically, since the first-side hole section 91 is formed into the conical frustum shape, the fuel flows, which are supplied into the first-side hole section 91 in the circumferential direction, collide with one another at a downstream end of the first-side hole section 91 near a downstream end of the conical frustum of the first-side hole section 91. The collided fuel has turbulence and enters the second-side hole section 92. The turbulent fuel flow is guided along the second-side hole section 92 and is injected from the fuel outlet 90b.

In the ninth embodiment, the fuel flows, which enter the first-side hole section 91 in the circumferential direction, collide with one another in the collision portion 93, so that atomization of fuel can be promoted like in the sixth embodiment. Furthermore, after the collision, the fuel is guided in the second-side hole section 92 and is injected from the second-side hole section 92. Therefore, the stable desired spray pattern of fuel mist can be formed in a predetermined location.

Furthermore, in the ninth embodiment, the second-side hole section 92 is formed into the conical frustum shape having the progressively increasing inner diameter, which progressively increases toward the fuel outlet 90b. Thus, the fuel, which is guided to the second-side hole section 92 and is injected from the second-side hole section 92, forms a corresponding conical frustum spray pattern. As a result, by adjusting a slope angle of the corresponding inner peripheral surface section of the injection hole plate 50, which forms the corresponding second-side hole section 92, the desired conical frustum shaped spray pattern of fuel mist can be formed.

Tenth Embodiment

Figure 26:
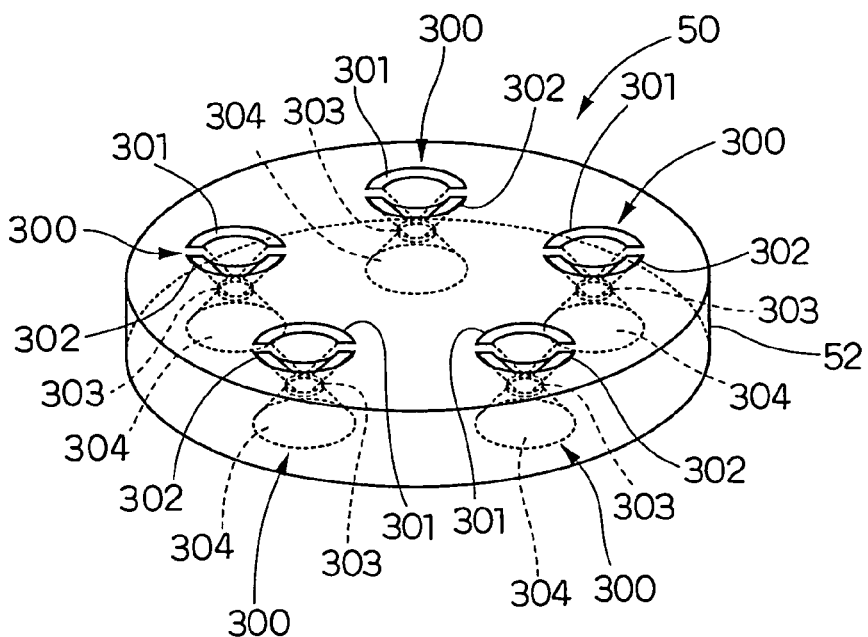
FIG. 26 is a schematic partial perspective view showing a base wall portion of an injection hole plate of a tenth embodiment of the present invention.
Figure 27:
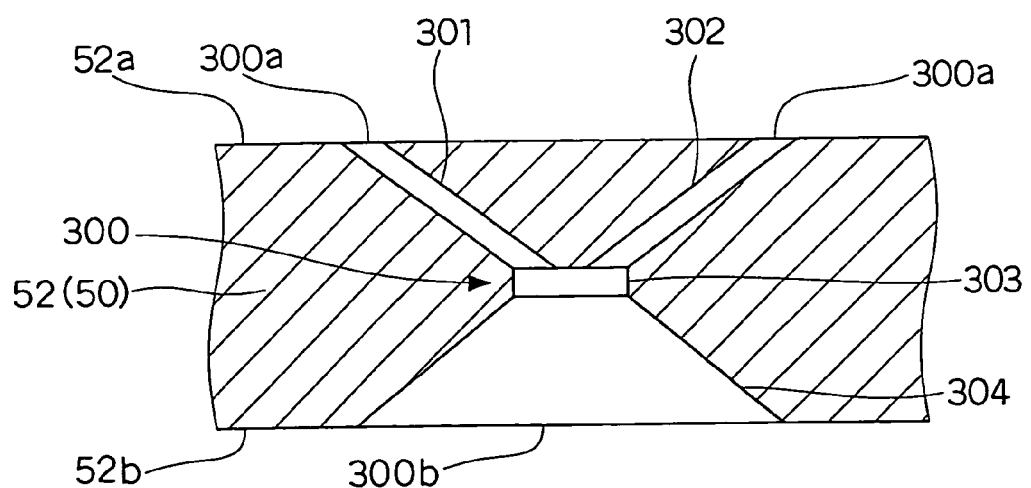
FIG. 27 is a partial enlarged cross sectional view showing an injection hole of the injection hole plate of the tenth embodiment.

FIGS. 26 and 27 show a base wall portion 52 of an injection hole plate 50 according to a tenth embodiment of the present invention. Components similar to those of the sixth embodiment will be indicated by the same numerals and will not be described further.

The tenth embodiment is substantially the same as the ninth embodiment shown in FIGS. 24 and 25 except the arrangement of the first-side hole section.

In the tenth embodiment, as shown in FIGS. 26 and 27, each injection hole 300 includes two first-side hole sections 301, 302, which are circumferentially separated from one another and forms a semi-annular conical frustum hole that is bound by a solid conical frustum portion in the area of the hole's radial center. In other words, the semi-frustum conical frustum holes of the first-side hole sections 301, 302 are formed by dividing an annular conical frustum hole, which is bounded by the solid conical frustum portion in the area of the hole's radial center, into two circumferentially separated sections. The first-side hole sections 301, 302 are angled relative to a central axis of the corresponding injection hole 300. That is, the first-side hole section 301 and the first-side hole section 302 progressively approach one another from the upstream end 52a of the injection hole plate 50 to a collision portion 303 and are connected to an upstream end of the collision portion 303. A second-side hole section 304 is connected to a downstream end of the collision portion 303. With the above arrangement, upstream ends of the first-side hole sections 301, 302, which are opened in the upstream end 52a of the injection hole plate 50, form fuel inlets 300a, respectively. A downstream end of the second-side hole section 304 forms a fuel outlet 300b.

By providing the first-side hole sections 301, 302, which are separated from one another in the circumferential direction, a fuel flow is formed in each of the first-side hole sections 301, 302. The fuel flow in the first-side hole section 301 and the fuel flow in the first-side hole section 302 collide and merge with one another in the collision portion 303 to form the turbulent fuel flow. The merged turbulent fuel flow is then supplied into the second-side hole section 304. Then, the turbulent fuel flow is guided through the second-side hole section 304 and is injected from the fuel outlet 300b.

In the tenth embodiment, the fuel flow in the first-side hole section 301 and the fuel flow in the first-side hole section 302 collide with one another, so that atomization of fuel can be promoted like in the sixth embodiment. Furthermore, after the collision, the fuel flow is guided along the second-side hole section 304, so that the stable desired spray pattern of fuel mist can be formed in a predetermined location.

(Modifications)

In the sixth embodiment, the two first-side hole sections are provided. In the seventh embodiment, the three first-side hole sections are provided. However, the number of the first-side hole sections are not limited to two or three and can be four or more.

Furthermore, in each of the first and seventh embodiments, the second-side hole section is generally parallel to the axis of the injection hole plate. However, in an appropriate case, the second-side hole section can be non-parallel to the axis of the injection hole plate to achieve a desired spray pattern of fuel mist.

In the eighth embodiment of the present invention, the two first-side hole sections and the two second-side hole sections are connected together at the collision portion.

However, the number of the first-side hole sections can be three or more, and the number of the second-side hole sections can be also three or more. These first-side hole sections and second-side hole sections can be joined together in the collision portion. The slope angles of the first-side hole sections and of the second-side hole sections relative to the direction parallel to the axis of the injection hole plate can differ from one another.

In the fourth and tenth embodiments, the second-side hole section is formed into the conical frustum shape, which has the progressively increasing inner diameter that increases toward the fuel outlet. Alternatively, the second-side hole section can be formed into a cylindrical shape, which has a constant inner diameter along its length.

In the tenth embodiment, the two first-side hole sections, which are circumferentially separated from one another, are used. Alternatively, three or more first-side hole sections, which are circumferentially separated from one another, can be used.

In the above embodiments, the injection hole plate is installed to the downstream end of the valve body, and the injection holes are provided in the injection hole plate. Alternatively, the present invention is equally applicable to a case where the injection hole plate is formed integrally with the valve body or to a case where the injection holes are formed directly in the valve body.

Additional advantages and modifications will readily occur to those skilled in the art. The invention in its broader terms is therefore not limited to the specific details, representative apparatus, and illustrative examples shown and described.

What is claimed is:

1. A fuel injection apparatus comprising:
   a valve body that includes a valve seat, which is formed in an inner peripheral surface of the valve body that forms a fuel passage in the valve body;
   an injection hole plate that is arranged downstream of the valve seat and includes a wall, which has a plurality of injection holes, wherein the injection holes penetrate through the wall of the injection hole plate to inject fuel supplied from the fuel passage, and each injection hole of the injection hole plate includes:
      at least one first-side hole section that extends from an upstream end of the wall of the injection hole plate to an axially intermediate point of the wall of the injection hole plate, which is located between the upstream end of the wall and a downstream end of the wall; and
      a second-side hole section that extends from the downstream end of the wall of the injection hole plate and is communicated with the at least one first-side hole section, wherein an upstream end of the second-side hole section is covered with a cover portion, and the at least one first-side hole section penetrates through the cover portion such that the at least one first-side hole section discharges fuel into the second-side hole section in a manner that forms a swirl fuel flow in the second-side hole section; and
   a valve member that is reciprocably received in the valve body and is seatable against the valve seat, wherein the valve member enables fuel injection from the injection holes when the valve member is lifted away from the valve seat, and the valve member disables fuel injection from the injection holes when the valve member is seated against the valve seat.

2. The fuel injection apparatus according to claim 1, wherein each injection hole includes a plurality of first-side hole sections.

3. The fuel injection apparatus according to claim 1, wherein at least a downstream end of each first-side hole section extends in one of:
   a direction of a tangent line to an imaginary circle, which is concentric with an upstream end of the second-side hole section; and
   a direction that is axially angled to the tangent line to the imaginary circle on the upstream side of the imaginary circle.

4. The fuel injection apparatus according to claim 1, wherein the second-side hole section has a circular cross section.

5. A fuel injection apparatus comprising:
   a valve body that includes a valve seat, which is formed in an inner peripheral surface of the valve body that forms a fuel passage in the valve body;
   an injection hole plate that is arranged downstream of the valve seat and includes a wall, which has a plurality of injection holes, wherein the injection holes penetrate through the wall of the injection hole plate to inject fuel supplied from the fuel passage, and each injection hole of the injection includes:
      a second-side hole section that extends from the downstream end of the wall of the injection hole plate and is communicated with the at least one first-side hole section, wherein the at least one first-side hole section discharges fuel into the second-side hole section; and
   a valve member that is reciprocably received in the valve body and is seatable against the valve seat, wherein the valve member enables fuel injection from the injection holes when the valve member is lifted away from the valve seat, and the valve member disables fuel injection from the injection holes when the valve member is seated against the valve seat,
   wherein a swirl direction of the swirl fuel flow in one of each adjacent two second-side hole sections of the injection hole plate is opposite to a swirl direction of the swirl fuel flow in the other one of each adjacent two second-side hole sections.

6. An injection hole plate for a fuel injection apparatus, the injection hole plate comprising a wall, which has a plurality of injection holes that penetrate through the wall of the injection hole plate to inject fuel, wherein each injection hole of the injection hole plate includes:
   at least one first-side hole section that extends from an upstream end of the wall of the injection hole plate to an axially intermediate point of the wall of the injection hole plate, which is located between the upstream end of the wall and a downstream end of the wall; and
   a second-side hole section that extends from the downstream end of the wall of the injection hole plate and is communicated with the at least one first-side hole section, wherein an upstream end of the second-side hole section is covered with a cover portion, and the at least one first-side hole section penetrates through the cover portion such that the at least one first-side hole section discharges fuel into the second-side hole section in a manner that forms a swirl fuel flow in the second-side hole section.

7. The injection hole plate according to claim 6, wherein each injection hole includes a plurality of first-side hole sections.

8. The injection hole plate according to claim 6, wherein the second-side hole section has a circular cross section.

9. The injection hole plate according to claim 6, wherein each first-side hole section has a circular cross section.

10. The injection hole plate according to claim 6, wherein each first-side hole section extends in a direction inclined to a plane of said wall.

11. The injection hole plate according to claim 6, wherein the second-side hole section extends in a direction perpendicular to a plane of said wall.

12. The fuel injection apparatus according to claim 1, wherein each first-side hole section has a circular cross section.

13. The fuel injection apparatus according to claim 1, wherein each first-side hole section extends in a direction inclined to a plane of said wall.

14. The fuel injection apparatus according to claim 1, wherein the second-side hole section extends in a direction perpendicular to a plane of said wall.

15. An injection hole plate for a fuel injection apparatus, the injection hole plate comprising a wall, which has a plurality of injection holes that penetrate through the wall of the injection hole plate to inject fuel, wherein each injection hole of the injection hole plate includes:

at least one first-side hole section that extends from an upstream end of the wall of the injection hole plate to an axially intermediate point of the wall of the injection hole plate, which is located between the upstream end of the wall and a downstream end of the wall; and a second-side hole section that extends from the downstream end of the wall of the injection hole plate and is communicated with the at least one first-side hole section, wherein the at least one first-side hole section discharges fuel into the second-side hole section in a manner that forms a swirl fuel flow in the second-side hole section, and a swirl direction of the swirl fuel flow in one of each adjacent two second-side hole sections is opposite to a swirl direction of the swirl fuel flow in the other one of each adjacent two second-side hole sections.

16. The injection hole plate according to claim 15, wherein each injection hole includes a plurality of first-side hole sections.

17. The injection hole plate according to claim 15, wherein the second-side hole section has a circular cross section.

18. The injection hole plate according to claim 15, wherein each first-side hole section has a circular cross section.

19. The injection hole plate according to claim 15, wherein each first-side hole section extends in a direction inclined to a plane of said wall.

20. The injection hole plate according to claim 15, wherein the second-side hole section extends in a direction perpendicular to a plane of said wall.

* * * * *